(12) United States Patent
Murray

(10) Patent No.: US 12,141,700 B2
(45) Date of Patent: Nov. 12, 2024

(54) GENERATIVE ADVERSARIAL NETWORK FOR GENERATING IMAGES

(71) Applicant: Naver Corporation, Seongnam-si (KR)

(72) Inventor: Naila Murray, Grenoble (FR)

(73) Assignee: Naver Corporation (KR)

( * ) Notice: Subject to any disclaimer, the term of this patent is extended or adjusted under 35 U.S.C. 154(b) by 1092 days.

(21) Appl. No.: 17/024,030

(22) Filed: Sep. 17, 2020

(65) Prior Publication Data

US 2021/0089903 A1 Mar. 25, 2021

(30) Foreign Application Priority Data

Sep. 24, 2019 (EP) .................................... 19306188

(51) Int. Cl.
*G06N 3/063* (2023.01)
*G06F 18/2132* (2023.01)
*G06N 3/045* (2023.01)
*G06N 3/08* (2023.01)
*G06N 3/084* (2023.01)
*G06T 3/4046* (2024.01)
*G06T 3/4053* (2024.01)

(52) U.S. Cl.
CPC ......... *G06N 3/084* (2013.01); *G06F 18/2132* (2023.01); *G06N 3/045* (2023.01); *G06N 3/063* (2013.01); *G06N 3/08* (2013.01); *G06T 3/4046* (2013.01); *G06T 3/4053* (2013.01)

(58) Field of Classification Search
CPC ........ G06N 3/084; G06N 3/045; G06N 3/063; G06N 3/08; G06F 18/2132; G06T 3/4046; G06T 3/4053
See application file for complete search history.

(56) References Cited

U.S. PATENT DOCUMENTS

2019/0251612 A1* 8/2019 Fang .................. G06Q 30/0643
2020/0242771 A1* 7/2020 Park ..................... G06T 11/001
2020/0356591 A1* 11/2020 Yada ................... G06F 16/5862
(Continued)

OTHER PUBLICATIONS

European Search Report for corresponding European Patent Application 19306188.4 Mar. 30, 2020.
(Continued)

*Primary Examiner* — Li B. Zhen
*Assistant Examiner* — Moriam Mosunmola Godo
(74) *Attorney, Agent, or Firm* — Michael J. Nickerson

(57) ABSTRACT

A generative adversarial network, a method of training a generator neural network, and a method of generating images using the generator network is provided. The generator neural network is configured to process an input comprising a noise vector and a pair of conditioning variables to generate an image according to the conditioning variables. The generator neural network includes a mixed-conditional batch normalization layer. The mixed-conditional batch normalization layer is configured to normalize a network layer output to generate a normalized network layer output, comprising transforming the network layer output in accordance with mixed-conditional batch normalization layer parameters to generate the normalized network layer output, wherein the mixed-conditional batch normalization layer parameters are computed by applying an affine transformation to the conditioning variables.

37 Claims, 13 Drawing Sheets

(56) References Cited

U.S. PATENT DOCUMENTS

2021/0383538 A1* 12/2021 Deasy ............... A61B 6/5211
2022/0367007 A1* 11/2022 Karpus ............... G16B 20/50

OTHER PUBLICATIONS

Yaxing Wang et al., "tarnsferring GANs: generating images from limited data," ARXIV.org. Cornell Unversity Library, 201 Olin Library, Cornell Unversity, Ithaca, NY 14853 (XP080885709) May 4, 2018.

Naila Murray, "Predicting aesthetic appreciation of images," Apr. 2, 2019 Apr. 2, 2019.

Barratt, Shane, and Rishi Sharma. 'A Note on the Inception Score'. ArXiv:1801.01973 [Cs, Stat], Jun. 21, 2018.

Bhattacharya, Subhabrata, Rahul Sukthankar, and Mubarak Shah. 'A Framework for Photo-Quality Assessment and Enhancement Based on Visual Aesthetics'. In Proceedings of the Inte.

Bhattacharya, Subhabrata, Rahul Sukthankar, 'A coherent framework for photo-quality assessment and enhancement based on visual aesthetics'. In ACM MM, 2010.

Brock, Andrew, Jeff Donahue, and Karen Simonyan. 'Large Scale GAN Training for High Fidelity Natural Image Synthesis', 2019.

Chen, Xi, Xi Chen, Yan Duan, Rein Houthooft, John Schulman, Ilya Sutskever, and Pieter Abbeel. InfoGAN: Interpretable Representation Learning by Information Maximizing Genera.

Courville, Aaron et al. 'Modulating Early Visual Processing by Language' NIPS 2017.

Deng, Yubin, Chen Change Loy, and Xiaoou Tang. 'Aesthetic-Driven Image Enhancement by Adversarial Learning'. In Proceedings of the 26th ACM International Conference on Multime.

Dumoulin, Vincent, Jonathon Shlens, and Manjunath Kudlur. 'A Learned Representation For Artistic Style'. ArXiv:1610.07629 [Cs], Feb. 9, 2017. http://arxiv.org/abs/1610.0762.

Gatys, Leon A., Alexander S. Ecker, and Matthias Bethge. 'Image Style Transfer Using Convolutional Neural Networks'. In 2016 IEEE Conference on Computer Vision and Pattern Rec.

Goodfellow, Ian, Jean Pouget-Abadie, Mehdi Mirza, Bing Xu, David Warde-Farley, Sherjil Ozair, Aaron Courville, and Yoshua Bengio. 'Generative Adversarial Nets', 2014.

Gordo, Albert, Jon Almazán, Jerome Revaud, and Diane Larlus. 'Deep Image Retrieval: Learning Global Representations for Image Search'. In Computer Vision—ECCV 2016, edited b.

He, Kaiming, Xiangyu Zhang, Shaoqing Ren, and Jian Sun. 'Deep Residual Learning for Image Recognition'. In 2016 IEEE Conference on Computer Vision and Pattern Recognition (CVP.

Heusel, Martin, Hubert Ramsauer, Thomas Unterthiner, Bernhard Nessler, and Sepp Hochreiter. 'GANs Trained by a Two Time-Scale Update Rule Converge to a Local Nash Equilibrium'.

Karras, Tero, Timo Aila, Samuli Laine, and Jaakko Lehtinen. 'Progressive Growing of Gans for Improved Quality, Stability, and Variation', 2018.

Kingma, Diederik P., and Jimmy Ba. 'Adam: A Method for Stochastic Optimization'. ArXiv:1412.6980 [Cs], Dec. 22, 2014.

Kingma, Diederik P., and Max Welling. 'Auto-Encoding Variational Bayes'. ArXiv:1312.6114 [Cs, Stat], May 1, 2014.

Kong, Shu, Xiaohui Shen, Zhe Lin, Radomir Mech, and Charless Fowlkes. 'Photo Aesthetics Ranking Network with Attributes and Content Adaptation'. In Computer Vision—ECCV 2016.

Krizhevsky, Alex. 'Learning Multiple Layers of Features from Tiny Images', Technical Report 2009.

Lecun, Yann. 'Gradient-Based Learning Applied to Document Recognition'. Proceedings of the IEEE, 1998.

Lim, Jae Hyun, and Jong Chul Ye. 'Geometric GAN'. ArXiv:1705.02894 [Cond-Mat, Stat], May 8, 2017.

Lu, Xin, Zhe Lin, Hailin Jin, Jianchao Yang, and James Z. Wang. 'RAPID: Rating Pictorial Aesthetics Using Deep Learning'. In In MM, 2014.

Lu, Xin, Zhe Lin, Hailin Jin, Jianchao Yang, and James. Z. Wang. 'Rating Image Aesthetics Using Deep Learning'. IEEE Transactions on Multimedia 17, No. 11. Nov. 2015.

Lucic, Mario, Karol Kurach, Marcin Michalski, Sylvain Gelly, and Olivier Bousquet. 'Are GANs Created Equal? A Large-Scale Study', NIPS 2018.

Marchesotti Luca, Murray Naila and Perronnin Florent, 'Discovering beautiful attributes for aesthetic image analysis'. ArXiv:1412.4940 [Cs], Dec. 16, 2014.v1.

Mirza, Mehdi, and Simon Osindero. 'Conditional Generative Adversarial Nets'. ArXiv:1411.1784 [Cs, Stat], Nov. 6, 2014.

Miyato, Takeru, Toshiki Kataoka, Masanori Koyama, and Yuichi Yoshida. 'Spectral Normalization for Generative Adversarial Networks', 2018.

Miyato, Takeru, and Masanori Koyama. 'CGans with Projection Discriminator', 2018.

Murray, N., L. Marchesotti, and F. Perronnin. 'AVA: A Large-Scale Database for Aesthetic Visual Analysis'. In 2012 IEEE Conference on Computer Vision and Pattern Recognition.

Murray, Naila, and Albert Gordo. 'A Deep Architecture for Unified Aesthetic Prediction'. ArXiv:1708.04890 [Cs], Aug. 16, 2017.

Odena, Augustus, Christopher Olah, and Jonathon Shlens. 'Conditional Image Synthesis with Auxiliary Classifier GANs'. In International Conference on Machine Learning, Sydney.

Radford, Alec, Luke Metz, and Soumith Chintala. 'Unsupervised Representation Learning with Deep Convolutional Generative Adversarial Networks'. ArXiv:1511.06434 [Cs], Jan. 7.

Rezende, Danilo Jimenez, Shakir Mohamed, and Daan Wierstra. 'Stochastic Backpropagation and Approximate Inference in Deep Generative Models', ICML, Beijing, China, 2014.

Russakovsky, Olga, Jia Deng, Hao Su, Jonathan Krause, Sanjeev Satheesh, Sean Ma, Zhiheng Huang, et al. 'ImageNet Large Scale Visual Recognition Challenge'. IJCV 2015.

Salimans, Tim, Ian Goodfellow, Wojciech Zaremba, Vicki Cheung, Alec Radford, Xi Chen, and Xi Chen. 'Improved Techniques for Training GANs', NIPS 2016.

Shih, YiChang, Sylvain Paris, Connelly Barnes, William T. Freeman, and Frédo Durand. 'Style Transfer for Headshot Portraits'. ACM Transactions on Graphics, Jul. 27, 2014.

Simonyan, Karen, and Andrew Zisserman. 'Very Deep Convolutional Networks for Large-Scale Image Recognition'. ArXiv:1409.1556 [Cs], Apr. 10, 2015.

Szegedy, Christian, Vincent Vanhoucke, Sergey Ioffe, Jon Shlens, and Zbigniew Wojna. 'Rethinking the Inception Architecture for Computer Vision'. In 2016 IEEE Conference on Co.

Tran, Dustin, Rajesh Ranganath, and David Blei. 'Hierarchical Implicit Models and Likelihood-Free Variational Inference', NIPS 2017.

Zhang, Rongjie, Xueliang Liu, Yanrong Guo, and Shijie Hao. 'Image Synthesis with Aesthetics-Aware Generative Adversarial Network'. In Advances in Multimedia Information Proces.

\* cited by examiner

GENERATIVE ADVERSARIAL NETWORK FOR GENERATING IMAGES

PRIORITY INFORMATION

Pursuant to 35 U.S.C. § 119 (a), this application claims the benefit of earlier filing date and right of priority to European Patent Application Number EP 19306188, filed on Sep. 24, 2019, the contents of which are hereby incorporated by reference in their entirety.

BACKGROUND

With the expansion of online content in recent years, demand for high quality images has increased. Content creators often like to include high-quality photography, for example on blog posts, but high-quality photography must usually be paid for and prices can be prohibitive for the average blogger. In the context of the present disclosure, "high quality images" refers to images that have aesthetically-pleasing features i.e., images that follow artistic rules and practices such as the golden ratio, the rule of thirds and color harmonies. A method to generate high aesthetic-quality images that can be tailored to the needed semantic content would therefore ease the job of content creators.

Recent years have seen an explosion in works aiming to model natural image distributions. Methods based on generative adversarial networks (GANs) and variational auto-encoders have been especially successful to generate highly realistic images. Generative adversarial networks in particular have been shown to produce highly photo-realistic images but are notoriously difficult to train. This is due to several factors, including the sensitivity of the minimax objective function to minor changes in the model architecture and hyper-parameters.

One method for improving stability and photo-realism is to condition the generative model using semantic information, e.g. class labels, which encourages the model to generate an image depicting the corresponding class. This also has the benefit of serving to regularize the model, which is of particular importance for small-scale training datasets. Class-conditional generation can also enable applications where some control over the synthesized images is desired.

Generative adversarial networks were originally formulated to train a generator to mimic some target distribution, and are often used to model datasets such as MNIST, CIFAR and ImageNet. These datasets all contain images belonging to one of a distinct set of categories. Therefore, generating realistic images conforming to the statistics of these datasets necessarily requires the generator to implicitly learn categorical information. In order to more explicitly encode this categorical information, Chen et al. (X. Chen et al., "Infogan: Interpretable representation learning by information maximizing generative adversarial nets", *NIPS*, 2016) introduced structure in a subset of the input random vector to the generator using information-theoretic regularization. Using this regularization, they were able to encode variations in MNIST, such as digit rotation and digit category, in this subset of the input random variables.

Rather than learning to disentangle in this manner, works on conditional generative adversarial networks have sought to explicitly encode variations of interest within the random vector. Categorical disentanglement is of particular interest, where one would like an explicit mapping between one or more variables in the random vector and a given object category in the target dataset. Typically, the categorical information is encoded with a one-hot vector that is appended to a random noise vector. To improve conditional generation, several works have augmented the objective function with loss functions targeting the categorization task.

There has been some work on enhancing the aesthetics of images using generative adversarial networks. Deng et al. (Y. Deng et al., "Aesthetic-driven image enhancement by adversarial learning", *ACMMM*, 2018) proposed a model for aesthetics-driven image enhancement which takes as input an image and generates a modified image with enhanced aesthetic properties.

There have been many works addressing the related problem of style transfer, where the goal is to transfer the style from a source image to an existing target image. For example, Shih et al., (Y. Shih et al., "Style transfer for headshot portraits", *ACM TOG*, 2014) aimed to transfer aesthetically-pleasing styles by performing style transfer on headshot photos using styles preferred by professional photographers when taking portraits.

There has been very little work, however, exploring aesthetics-aware training of generative adversarial networks. The work of Zhang et al. (R. Zhang, "Image synthesis with aesthetics-aware generative adversarial network", *Pacific Rim Conference on Multimedia*, 2018) includes two additional objectives in the loss function for training the generative adversarial network.

One is a content-aware loss, which captures the distance between feature maps given by the generator and those given by VGGNet. The assumption is that VGGNet encodes semantic properties and so minimizing this loss will enhance the semantic properties of the generated image. The second loss is an aesthetics-aware loss, which aims to maximize the aesthetic score of generated images (using an auxiliary network to score the images according to their aesthetic quality). While this encourages the generator to synthesize aesthetically pleasing images, it does not allow the generator to be conditioned on an aesthetic random variable.

One challenge associated with training generative adversarial networks for aesthetics is that it is difficult to express the aesthetic properties of an image in a manner suitable for conditioning a neural network, because such properties are subjective. For this reason, the aesthetics properties of images are often expressed as a histogram of scores, each score being given by a different observer. The aesthetic annotations of the AVA dataset are an example of such annotations (N. Murray et al, "Ava: A large-scale database for aesthetic visual analysis", *CVPR*, 2012). Most works that use these data do not use these score histograms directly, but convert the histogram into a binary label by thresholding the mean score of each image.

However, the chosen threshold is arbitrary and can introduce noise when training. In fact, it has been found that, when training aesthetic classification models using thresholded scores as labels, removing training images with scores close to the threshold resulted in faster model convergence and similar test-time performance. Because generative adversarial network training is sensitive to noisy annotations, it is preferable to avoid thresholding.

Another challenge is that there is no publicly available large-scale dataset with both reliable semantic annotations and reliable aesthetic annotations. Aesthetics datasets sourced from dpchallenge.com, such as AVA, contain reliable aesthetic annotations, in the form of a histogram of scores ranging from 1 to 10. Images in AVA have on average 210 scores. However, images from dpchallenge.com only contain weak and incomplete semantic annotations in the form of tags given to images by photographers.

Photographers are limited to a maximum of two tags, chosen from a predefined list, so additional tags that might be relevant cannot be added. In addition, different taggers have different conceptions of the semantics of different tags and no guidance is given in using them. As a result, images with a given tag tend to have a high variety of visual content and such tags are too noisy to be reliably used to train our model. Datasets, sourced from Flickr or photo.net, have similar limitations to collecting semantic annotations. Their aesthetic annotations are also less interpretable and sparser.

Furthermore, designing neural networks based on current approaches is non-trivial, since current approaches are often used for only a specific purpose. For example, if it is not clear on which features a neural network bases its results, a simple combination with another neural network or a part of another neural network may not be possible. Whether a combination of two different approaches or networks provides a specific result can be expensive to evaluate.

Accordingly, there is a need in the art to address the problems associated with the sensitivity of generative adversarial networks to training and the lack of availability of suitable large-scale training datasets for training aesthetically-aware generative adversarial networks.

It is therefore desirable to provide a generative adversarial network that overcomes the above disadvantages of the prior art.

BRIEF DESCRIPTION OF THE DRAWINGS

The drawings are only for purposes of illustrating various embodiments and are not to be construed as limiting, wherein.

DETAILED DESCRIPTION OF THE DRAWING

Described herein are systems and methods for generating images using a generative adversarial network. For purposes of explanation, numerous examples and specific details are set forth in order to provide a thorough understanding of the described embodiments. The illustrative embodiments will be described with reference to the drawings wherein like elements and structures are indicated by like reference numbers. Further, where an embodiment is a method, steps and elements of the method may be combinable in parallel or sequential execution. As far as they are not contradictory, all embodiments described below can be combined with each other.

Figure 1:
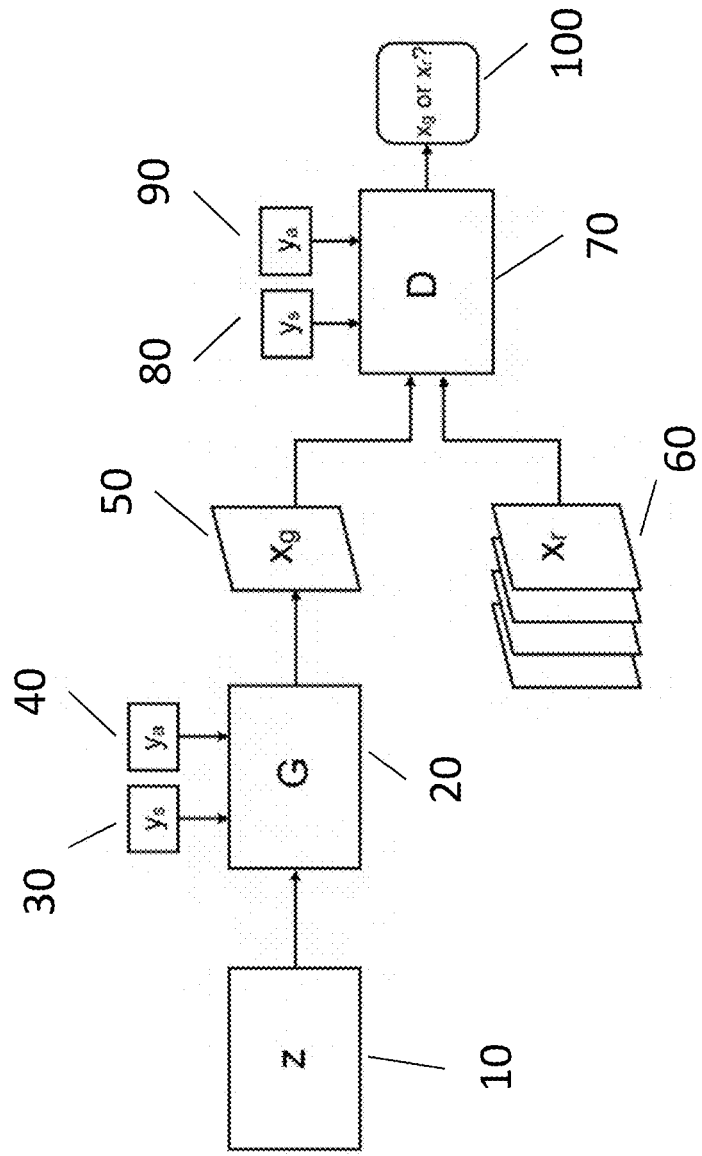
FIG. 1 illustrates a block diagram of a generative adversarial network.

FIG. 1 illustrates a generative adversarial network. The generative adversarial network comprises a generator neural network or synthetic image generating neural network (G) 20 coupled to a discriminator neural network (D) 70. In an embodiment, the generator neural network (G) 20 and the discriminator neural network (D) 70 are convolutional neural networks (CNN).

The generator neural network (G) 20 is configured to process an input comprising an input noise vector (z) 10 and a pair of conditioning variables ($y_s$, $y_a$) (30 and 40) to generate an image ($x_g$) 50 according to the pair of conditioning variables. The input noise vector (z) 10 is sampled from an arbitrary noise distribution $P_{noise}(z)$. In other words, the input noise vector comprises random variables drawn from an arbitrary distribution such as a uniform distribution.

The pair of conditioning variables ($y_s$, $y_a$) (30 and 40) is obtained from a memory 60 having a dataset of images ($x_r$) in which each image is labeled with a pair of conditioning variables. According to an embodiment, the first conditioning variable ($y_s$) 30 is a category label (e.g., "lake", "meadow", "sunset", "barn" etc.). Thus, the first conditioning variable ($y_s$) 30 corresponds to semantic information and may also be referred to as the categorical conditioning variable.

The second conditioning variable ($y_a$) 40 is a histogram of scores. The histogram of scores may correspond to an aesthetic annotation of the respective image given by different observers of an image (i.e., the second conditioning variable ($y_a$) 40 corresponds to aesthetic information).

For example, for each image ($x_r$) in the dataset, observers may be asked to provide a score between 0 and 10 to rate the aesthetic properties of the image. The images are then labeled with the resulting distribution of scores (i.e., the histogram of scores) corresponding to the individual scores from each observer. However, in other embodiments, the second conditioning variable ($y_a$) 40 may relate to any other image property that may be represented by a score on a predefined scale. The second conditioning variable ($y_a$) 40 may be referred to as the continuous conditioning variable.

Accordingly, in embodiments, the generative adversarial network is configured to learn a generative image model conditioned on both semantic and aesthetic properties. Once trained using the generative adversarial network, the generator neural model may be used to generate a synthetic image with specified semantic and aesthetic properties.

The labeled images ($x_r$) of the dataset may be referred to as "real images" in the sense that these images are not generated by the generator neural network (G) 20. For examples, real images may be photographs or digitized versions of paintings or drawings. Images ($x_g$) 50 generated by the generator neural network (G) 20 may be referred to as generated images or synthetic images.

The discriminator neural network (D) 70 is configured to receive and process an image (that is either a synthetic image ($x_g$) generated by the generator neural network (G) 20 or a real image ($x_r$) from the dataset of images ($x_r$)) and the pair of conditioning variables ($y_s$, $y_a$) (30 and 40) to output a discrimination prediction indicating whether the received image is the image ($x_g$) 50 generated by the generator neural network (G) 20 or a real image ($x_r$) from the set of real images.

As discussed in more detail below with respect to FIG. 4, the generative adversarial network trains a generative image model using the standard two-player adversarial game. Here the discriminator neural network (D) 70 is in a feedback loop with the ground truth of the images, which is known, and the generator neural network (G) 20 is in a feedback loop with the discriminator. The competition between the generator neural network (G) 20, whose goal is to generate images that are indistinguishable from the training set of real images, and the discriminator neural network (D) 70, whose goal is to discriminate between real and generated images, results in the optimization of both neural networks.

Accordingly, once the generative adversarial network is trained, the generator neural network is able to generate synthetic images according to the input pair of conditioning variables (e.g., according to a desired category and a desired aesthetic or other quality).

Figure 2:
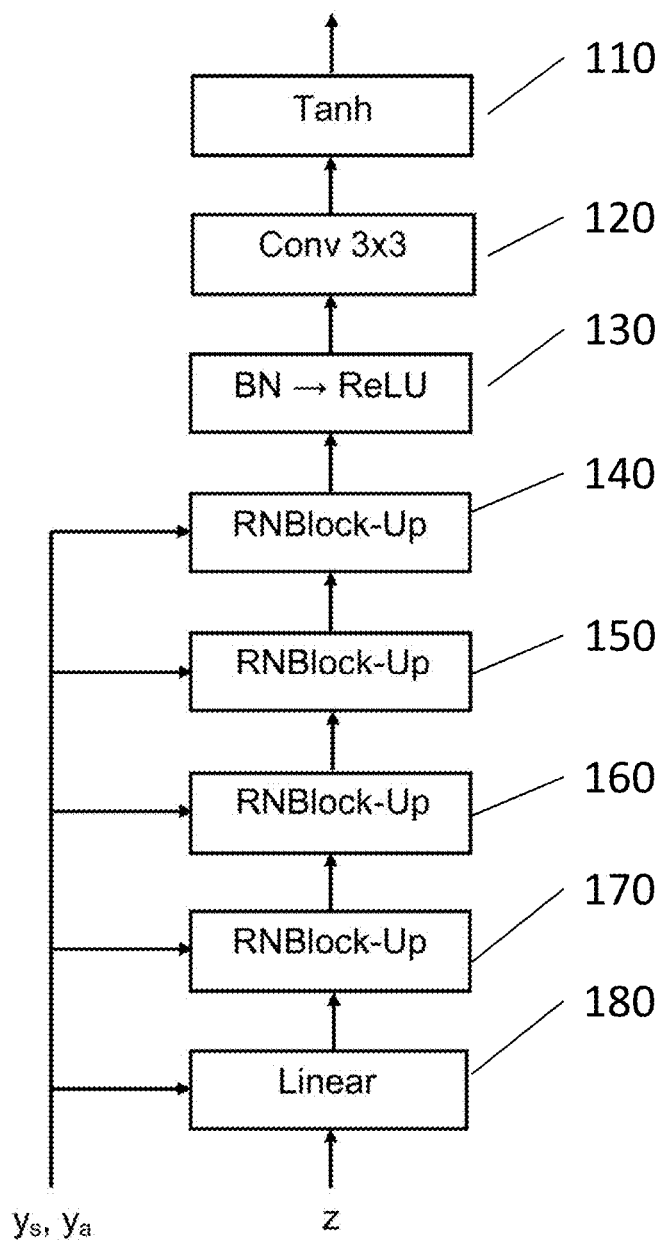
FIG. 2 illustrates a block diagram of a generator neural network of the generative adversarial network.

FIG. 2 illustrates the generator neural network (G) 20 in more detail according to an embodiment. Each block represents a layer of the network. The noise vector (z) is mapped to a generator neural network input layer. In an embodiment, the generator neural network input layer is a linear layer 180. The generator neural network input layer computes a representation of the noise vector (z), which is then output to the next layer of the generator neural network.

In the embodiment illustrated in FIG. 2, the output of the generator neural network input layer is received by a ResNet block with upsampling layers (RNBlock-Up layers) (170, 160. 150, and 140). The generator neural network (G) 20 comprises at least one RNBlock-Up layer. In the embodiment illustrated in FIG. 2, the generator neural network (G) 20 comprises four RNBlock-UP layers (170, 160. 150, and 140).

The generator neural network (G) 20 may further comprise one or more convolutional layers (Conv 3×3) 120 and/or employ one or more activation functions, such as rectified linear unit (ReLU) 130 and Tanh 110. A rectified linear unit may employ a rectifier, which is an activation function defined as the positive part of its argument. The activation function of a node defines the output of that node given an input or set of inputs. The output from Tanh 110 can be positive or negative, allowing for increases and decreases in the state.

The RNBlock-Up layers (170, 160. 150, and 140) are additionally configured to receive as input the pair of conditioning variables.

In an embodiment, for inputting into the generator neural network (G) 20, the first (categorical) conditioning variable ($y_s$) 30 is encoded as a one-hot vector and the second (continuous) conditioning variable ($y_a$) 40 is encoded as a histogram of scores.

Figure 3:
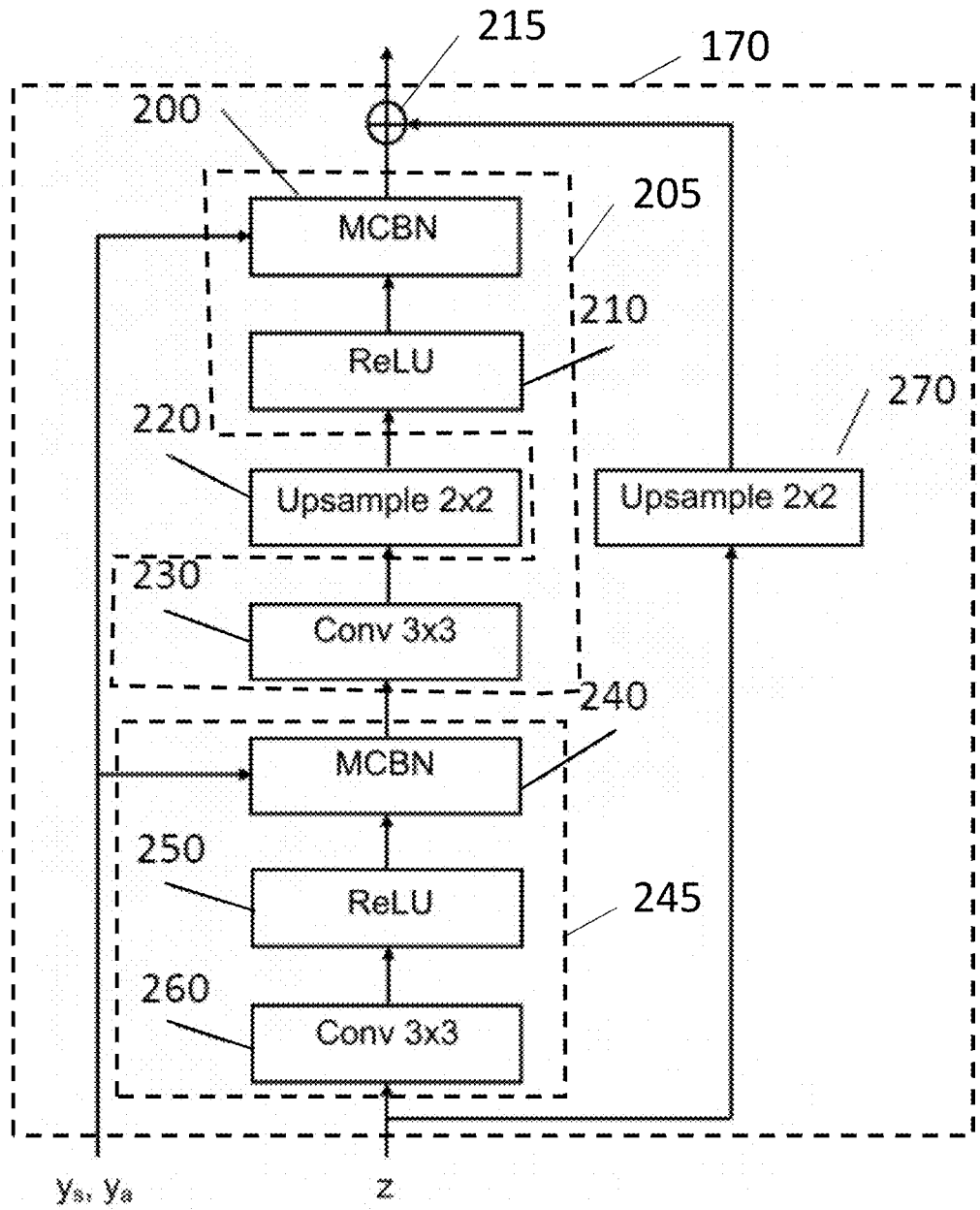
FIG. 3 illustrates a block diagram of a ResNet Block with upsampling layer of the generator neural network.

FIG. 3 illustrates one RNBlock-Up layer 170 of FIG. 2 according to an embodiment. The RNBlock-Up layer 170 contains two internal units 245 and 205, each, respectively, comprising at least one convolutional layer (Conv 3×3) 260 and 230, a rectified linear unit (ReLU) 250 and 210 and a mixed-conditional batch normalization (MCBN) layer 240 and 200. The RNBlock-Up layer 170 includes an upsampling layer ("Upsample 2×2") 270, which is connected in parallel to the internal units 245 and 205. The upsampling layer 270 increases the dimensionality of the signal z.

As illustrated in the embodiment shown in FIG. 3, the RNBlock-Up layer 170 includes an upsampling layer ("Upsample 2×2") 220 between the convolutional layer (Conv 3×3) 230 and rectified linear unit (ReLU) 210 of internal unit 205. Upsampling layer 220 increases the dimensionality of signal z, being processed by internal unit 205 so that the dimensionality of signal z, processed by upsampling layer 270 matches the dimensionality of signal z, processed by internal unit 205. The use of the two parallel upsampling layers 270 and 220 enables the combining of the signal z, being processed by internal unit 205 and signal z, processed by upsampling layer 270 at combining layer (adder or mixer) 215.

It is noted that the upsampling layer 220 may be located at different locations along the signal path of the internal units 245 and 205 so long as the upsampling layer 220 increases the dimensionality of signal z, being processed by internal units 245 and 205 to match the dimensionality of signal z, processed by the parallel upsampling layer 270. For example, the upsampling layer 220 may be located between the mixed-conditional batch normalization layer 240 and the convolutional layer 230.

It is further noted that a RNBlock-Up layer may include more than two internal units (convolutional layer, rectified linear unit, and mixed-conditional batch normalization layer). An internal unit may be stacked, multiple times, in the RNBlock-Up layer. In such an embodiment, one of the stacked internal units may include the upsampling layer, as illustrated in FIG. 3, to insure dimensionality agreement between the parallel processed signals, or the upsampling layer, that may be located at different locations along the stacked internal units' path so long as the upsampling layer increases the dimensionality of signal being processed by stacked internal units matches the dimensionality of signal processed by the parallel upsampling layer.

More generally, each RNBlock-Up layer comprises at least one internal unit 245 with a mixed-conditional batch normalization (MCBN) layer 240 after a first generator neural network layer (e.g., convolutional layer (Conv 3×3) 260) and a second generator neural network layer (e.g., rectified linear unit (ReLU) 250) that outputs to a third generator neural network layer (e.g., a second internal unit 205, an RNBlock-Up layer 160, or rectified linear unit (ReLU) 130).

The normalization performed by the mixed-conditional batch normalization (MCBN) layer (240 and 200) will be described in more detail below and is related to both conditional batch normalization and conditional instance normalization techniques.

Batch normalization is a technique used to counteract the internal covariate shift between two layers of a neural network, thereby reducing training time and improving generalization. Batch normalization normalizes activations throughout the neural network with respect to each minibatch by transforming the inputs of each layer to have a fixed mean and variance.

Specifically, batch normalization normalizes the output of a previous activation layer by subtracting the batch mean and dividing by the batch standard deviation. Each layer has two learnable parameters so the normalized output is multiplied by a standard deviation parameter (the scaling parameter, A) and add a mean parameter (the shifting parameter, P).

Conditional batch normalization is similar to batch normalization, but instead of learning the scaling and shifting parameters, the scaling and shifting parameters are learned as a function of some input. Specifically, conditional batch normalization is formulated as:

$$o_{i,c} = \hat{\lambda}_c \left( \frac{h_{i,c} - \mu_c}{\sigma_c} \right) + \hat{\beta}_c \quad (1)$$

where $h_{i,c}$ is one element of channel c, and $\mu_c$ and $\sigma_c$ are computed batch statistics.

The scaling and shifting parameters, $\hat{\lambda}_c$ and $\hat{\beta}_c$, are computed by first applying two affine transformations to the embedding to compute the vectors $\Delta\lambda \in \mathbb{R}^{|C|}$ and $\Delta\beta \in \mathbb{R}^{|C|}$, where |C| is the number of channels. $\hat{\lambda}_c$ and $\hat{\beta}_c$ are computed as:

$$\hat{\lambda} = \lambda + \Delta\lambda; \hat{\beta} = \beta + \Delta\beta \quad (2)$$

The affine transformation is learned after fixing all other parameters in the network.

Another normalization technique, conditional instance normalization was originally designed to condition visual representations on different visual styles. It is formulated as:

$$o_{i,c} = \hat{\lambda}_{s,c} \left( \frac{h_{i,c} - \mu_c}{\sigma_c} \right) + \hat{\beta}_{s,c} \quad (3)$$

Here, $s \in S$, where S is a set of (style or semantic) categories, and $\hat{\lambda}_{s,c}$ and $\hat{\beta}_{s,c}$ are the category- and channel-specific scaling and shifting parameters. The $\hat{\lambda}_{s,c}$ and $\hat{\beta}_{s,c}$ parameters are stored in a look-up table and trained via backpropagation with the rest of the network.

Mixed-conditional batch normalization (MCBN) uses a set of affine transformations $\{\mathcal{A}_s | s \in S\}$ to condition on both categorical information related to semantics and continuous information in the form of the histogram score distributions, where S is the set of (semantic) categories. Each affine transformation $\mathcal{A}_s$ is parameterized by a set of tuples $\{W_\lambda, b_\lambda, W_\beta, b_\beta\}_s$, with $W_\lambda, W_\beta \in \mathbb{R}^{R \times |C|}$ and $b_\lambda, b_\beta \in \mathbb{R}^{|C|}$. R is the dimension of the score histogram, and |C| is the number of channels. The scaling and shifting parameters are then calculated as follows:

$$\lambda_{s,a} = y'_a W_s^\lambda + b_s^\lambda; \beta_{s,a} = y'_a W_s^\beta + b_s^\beta \quad (4)$$

The affine transformation parameters are learned end-to-end with the rest of the generative adversarial network parameters. Mixed-conditional batch normalization (MCBN) is similar to conditional instance normalization in that the affine parameters are selected via a look-up table and trained end-to-end. Mixed-conditional batch normalization (MCBN) is also related to conditional batch normalization in that it uses affine transformations to compute scaling and shifting parameters.

Thus, according to an embodiment, the mixed-conditional batch normalization (MCBN)layer (240 and 200) is configured to, during processing of the input by the generator neural network (G) 20, receive a first layer output generated by the first neural network layer and the pair of conditioning variables.

The mixed-conditional batch normalization (MCBN) layer (240 and 200) normalizes the first layer output to generate a normalized layer output, comprising transforming the first layer output in accordance with mixed-conditional batch normalization (MCBN) layer parameters (i.e., the scaling parameter, $\lambda$, and the shifting parameter, $\beta$) to generate the normalized layer output. The mixed-conditional batch normalization (MCBN) layer (240 and 200) then provides the mixed-conditional batch normalization (MCBN) layer output as an input to the second neural network layer.

In an embodiment, the mixed-conditional batch normalization (MCBN) layer parameters are computed by applying an affine transformation ($\mathcal{A}_s$) to the second conditioning variable ($y_a$) in accordance with equation 4 above. The affine transformation is selected from a look-up table and corresponds to the first conditioning variable ($y_s$) input into the mixed-conditional batch normalization (MCBN) layer (240 and 200).

The look-up table stores a plurality of affine transformations, each affine transformation being associated with a first conditioning variable ($y_s$). The affine transformations are determined by training the generative adversarial network.

Figure 4:
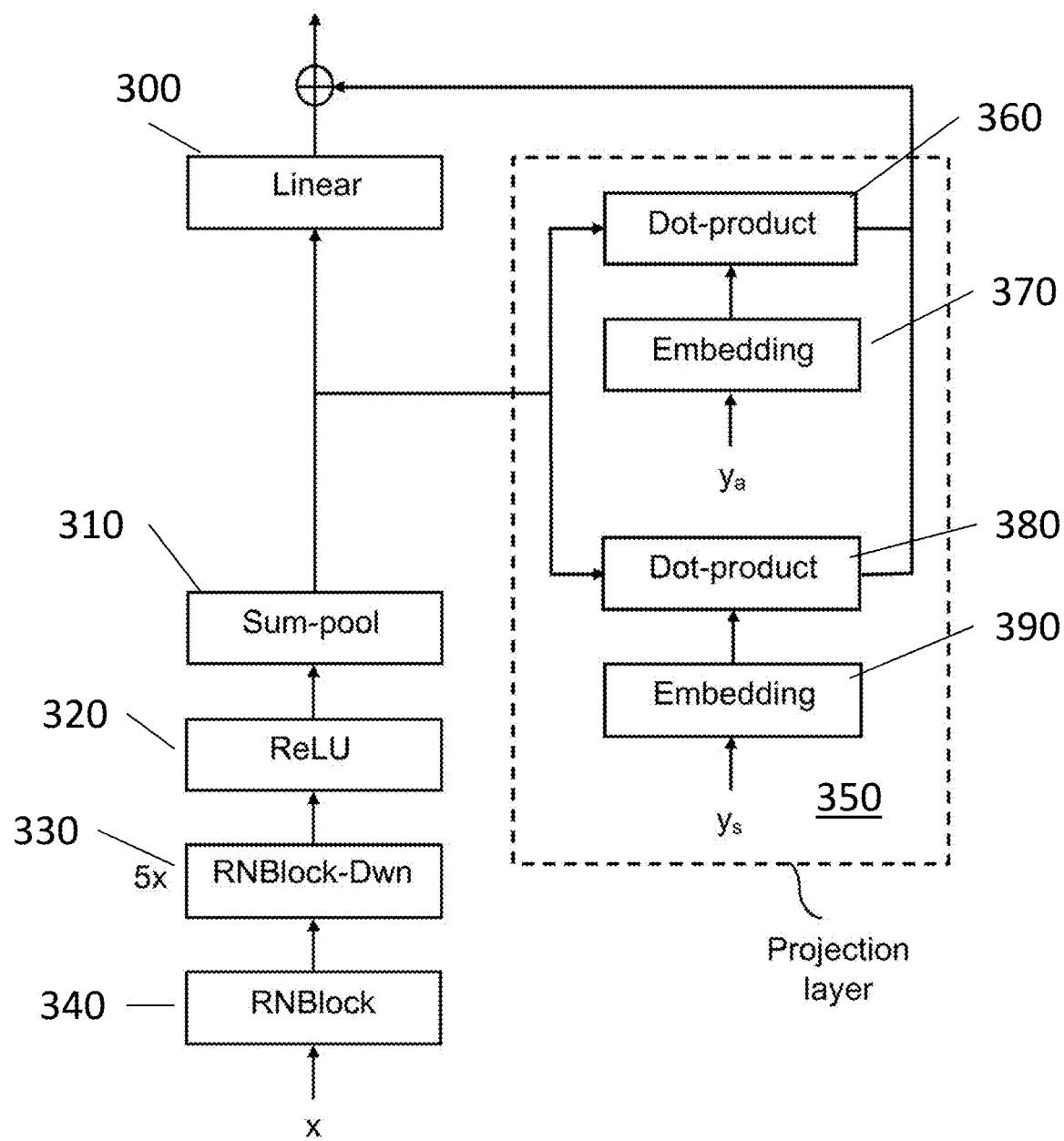
FIG. 4 illustrates a block diagram of a discriminator neural network of the generative adversarial network.

FIG. 4 illustrates the discriminator neural network (D) 70 of FIG. 1 in more detail. The RNet-Dwn layers (340 and 330) of FIG. 4 differs from the RNBlock-Up layer of FIG. 2 in that the input is downsampled rather than upsampled and regular batch normalization is used instead of mixed-conditional batch normalization.

In an embodiment, the discriminator neural network (D) 70 comprises a projection layer 350 between a first discriminator neural network layer and a second discriminator neural network layer. FIG. 4 illustrates the projection layer 350 between a sum-pool layer 310 and a linear (output) layer 300 of the discriminator neural network (D) 70. The projection layer 350 enables the discriminator neural network (D) 70 to map each of a first conditioning variable ($y_s$) and a second conditioning variable ($y_a$) into a shared space with an image representation generated by the first discriminator neural network layer.

In an embodiment, the generative adversarial network is trained using a hinge loss. To arrive at the projection formulation, the optimal solution for the hinge discriminator loss can be decomposed into the sum of two likelihood ratios as follows:

$$D^*(x, y_s, y_a) = \log \frac{q(x|y_s, y_a)q(y_s, y_a)}{p(x|y_s, y_a)p(y_s, y_a)} = \log \frac{q(x|y_s, y_a)}{p(x|y_s, y_a)} + \log \frac{q(x)}{p(x)} \quad (5)$$

To model $q(y_s, y_a|x)$ and $p(y_s, y_a|x)$, it is assumed that the conditioning variables, $y_s$ and $y_a$, are conditionally independent. While works have shown that aesthetic properties are content-dependent, this simplifying assumption works well in practice. The optimal solution is then formulated as follows:

$$D^*(x, y_s, y_a) = \log \frac{q(y_s|x)}{p(y_s|x)} + \log \frac{q(y_a|x)}{p(y_a|x)} + \log \frac{q(x)}{p(x)} \quad (6)$$

Assuming a log-linear model for $q(y_s|x)$ gives:

$$\log q(y_s|x) = v_s^{qT} \phi(x) - \log Z_s^q(\phi(x)) \quad (7)$$

\where s is the semantic category, $\phi(x)$ is the image representation and $Z_s^q$ is the partition function of $q(y_s|x)$.

Modeling $p(y_s|x)$ analogously gives:

$$\log \frac{q(y_s|x)}{p(y_s|x)} = (v_s^q - v_s^p)^T \phi(x) - \log \frac{Z_s^q(\phi(x))}{Z_s^p(\phi(x))} \quad (8)$$

If $q(y_a|x)$ and $p(y_a|x)$ are modeled as Gaussian distributions, the following similar form is obtained:

$$\log\frac{q(y_a \mid x)}{p(y_a \mid x)} = \kappa + y_a^T U\phi(x) - \log\frac{Z_a^q(\phi(x))}{Z_a^p(\phi(x))} \qquad (9)$$

where κ is a constant dependent only on $y_a$ that can be ignored in the optimization, and U is a projection from $y_a$ to the image representation space.

Estimating $$\log\frac{q(x)}{p(x)} - \log\frac{Z_s^q(\phi(x))}{Z_s^p(\phi(x))} - \log\frac{Z_a^q(\phi(x))}{Z_s^p(\phi(x))} \text{ as } \psi(\phi(x)),$$

where ψ is a fully-connected layer, D can then be parameterized as:

$$D(x,y_s,y_a) = y_s^T V\phi(x) + y_a^T U\phi(x) + \psi(\phi(x)) \qquad (10)$$

where $y_s^T V = v_s = v_s^q - v_s^p$. The semantic and aesthetic embedding functions V and U are trained end-to-end along with the other generative adversarial network parameters.

As illustrated in FIG. 4, the projection layer 350 comprises a first embedding layer 390 and a second embedding layer 370 configured to receive the first conditioning variable ($y_s$) and the second conditioning variable ($y_a$), respectively. The embedding layers (390 and 370) are configured to map the respective conditioning variable to a vector space to generate a respective embedding.

The projection layer 350 additionally comprises a first compatibility function layer 380 and a second compatibility function layer 360. The first compatibility function layer 380 is configured to receive an image representation of the image computed by the first discriminator neural network layer and an embedding of the first conditioning variable ($y_s$) computed by the first embedding layer 390. The first compatibility function layer 380 is further configured to compute a first dot product between the embedding of the first conditioning variable ($y_s$) and the received image representation.

The second compatibility function layer 360 is configured to receive an image representation of the image computed by the first discriminator neural network layer and an embedding of the second conditioning variable ($y_a$) computed by the second embedding layer 370. The second compatibility function layer 360 is further configured to compute a second dot product between the embedding of the second conditioning variable ($y_a$) and the received image representation.

The projection layer 350 is further configured to output, to the second discriminator neural network layer, the first dot product and the second dot product as a projection layer output.

In an embodiment, the second discriminator neural network layer is a final layer of the discriminator neural network (D) 70 and the discrimination prediction is generated based on the projection layer output. Specifically, as illustrated in FIG. 4, the discrimination prediction is based on the sum of the output of the final layer of the discriminator neural network (D) 70, the first dot product and the second dot product.

The dot product between the projection of the conditioning variable and the image representation serves as a compatibility function. This compatibility function is then maximized when training the generator and maximized (resp. minimized) when training the discriminator with real (resp. generated) images.

In other words, learnable parameters of the discriminator neural network (D) include the parameters of the compatibility functions layers of the projection layer.

Figure 5:
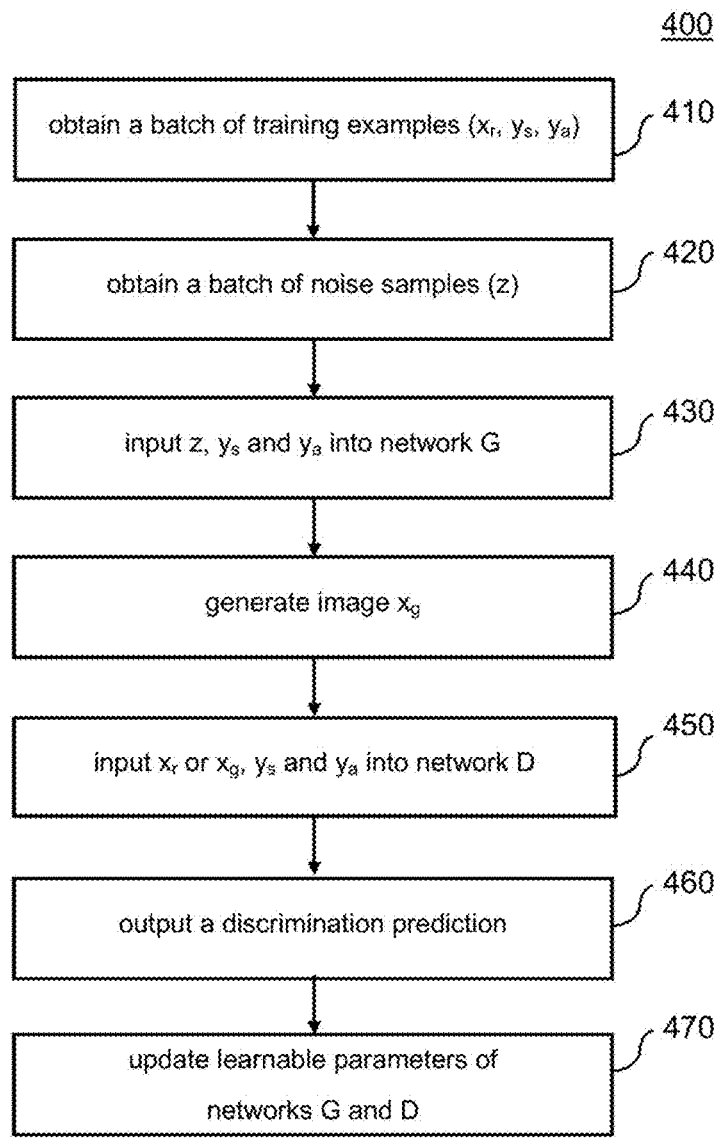
FIG. 5 illustrates a process flow diagram for a method of training the neural networks of the generative adversarial network.

FIG. 5 illustrates a method 400 of training the generative adversarial network of FIGS. 1 to 4. The generative adversarial network is trained using a training dataset comprising a plurality of batches of training examples. Each training example comprises a real image ($x_r$) labeled with a pair of conditioning variables ($y_s$, $y_a$) i.e., each real image is annotated (labeled) with both semantic information (corresponding to a respective first conditioning variable) and aesthetic (or other) information (corresponding to a respective second conditioning variable). Accordingly, a batch of training data is obtained at step 410.

In addition, a discussed above, the generator neural network (G) generates images based on an arbitrary noise distribution. Accordingly, the noise distribution is sampled to obtain a batch of noise samples (noise vectors). Thus, at step 420, a batch of noise vectors (z) is obtained.

At step 430, a noise vector (z) and a pair of conditioning variables ($y_s$, $y_a$) is input into the generator neural network (G). The generator neural network (G) then, at step 440, generates an image ($x_g$) based on the noise vector (z) and the pair of conditioning variables ($y_s$, $y_a$). The generator neural network (G) then outputs the generated image ($x_g$) to the discriminator neural network (D).

In an embodiment, the generator neural network (G) comprises the mixed-conditional batch normalization, MCBN, layer discussed in relation to FIG. 3 above. During the processing of the noise sample (z) performed by the generator neural network (G) at step 440, the mixed-conditional batch normalization (MCBN) layer receives a first layer output generated by the first neural network layer and the pair of conditioning variables. The mixed-conditional batch normalization (MCBN) layer normalizes the first layer output to generate a normalized layer output, comprising transforming the first layer output in accordance with mixed-conditional batch normalization (MCBN) layer parameters to generate the normalized layer output. The mixed-conditional batch normalization (MCBN) layer parameters include the scaling and shifting parameters, which are computed by applying an affine transformation to the second conditioning variable in accordance with equation 4 above. The mixed-conditional batch normalization (MCBN) layer then provides the output as an input to the second neural network layer.

The affine transformations are stored in a look-up table, wherein each affine transformation of the plurality of affine transformations is associated with a respective first conditioning variable. Accordingly, the affine transformation applied to the second conditioning variable is selected according to the first conditioning variable of the pair of conditioning variables input into the generator neural network (G). Parameters of the plurality of affine transformations are learnable parameters of the neural network.

The discriminator neural network (D) is coupled to the generator neural network (G) and is configured to receive images ($x_g$) generated by the generator neural network (G). The discriminator neural network (D) is further configured to receive real images ($x_r$) of the training examples.

Specifically, at step 450, an image is input into the discriminator neural network (D). The image is one of the generated image ($x_g$) and a real image ($x_r$) of the batch of training examples. The discriminator neural network (D) then processes the image to generate a discrimination prediction indicating whether the image is a generated image ($x_g$) or a real image ($x_r$). The discriminator neural network (D) outputs the discrimination prediction at step 460.

In an embodiment, the discriminator neural network (D) is further configured to receive the conditioning variables ($y_s$, $y_a$) of the training examples. In such an embodiment, the discriminator neural network (D) comprises a projection layer between a first discriminator neural network layer and a second discriminator neural network layer. The first discriminator neural network layer computes an image representation of the image input into the discriminator neural network. The projection layer receives the image representation and the pair of conditioning variables of the batch of training examples.

Specifically, the projection layer comprises a first and a second embedding layer, and a first and a second compatibility function layer. The embedding layers are configured to receive the conditioning variables.

The first embedding layer computes a first embedding for the first conditioning variable ($y_s$) and the second embedding layer computes a second embedding of the second conditioning variable ($y_a$). The first embedding layer and the second embedding layer output their respective embeddings to the first and the second compatibility function layer, respectively.

The compatibility function layers are configured to receive the image representation and the embeddings. The first compatibility function layer computes a first dot product between the first embedding of the first conditioning variable ($y_s$) and the received image representation and the second compatibility function layer computes a second dot product between the second embedding of the second conditioning variable ($y_a$) and the received image representation.

Finally, the projection layer outputs, to the second discriminator neural network layer, the first dot product and the second dot product as a projection layer output. Learnable parameters of the discriminator neural network (D) include parameters of the first and the second compatibility function layers. In an embodiment, the second discriminator neural network layer is a final layer of the discriminator neural network (D) and the discrimination prediction is generated based on the projection layer output.

As discussed above, the generative adversarial network is trained using the standard two-player adversarial game. The generative adversarial network may be trained using any suitable loss function. In an embodiment, the generator neural network (G) and the discriminator neural network (D) are trained adversarially using a hinge loss:

$$\min_D E_{q(y_s, y_a)}[E_{q(x|y_s, y_a)}[\max(0, 1 - D(x, y_s, y_a))]] + \quad (11)$$

$$E_{q(y_s, y_a)}[E_{p(z)}[\max(0, 1 + D(G(x, y_s, y_a), y_s, y_a))]]$$

$$\min_G -E_{q(y_s, y_a)}[E_{p(z)}[D(G(z, y_s, y_a), y_s, y_a]]$$

The generative adversarial network is trained by repeatedly updating learnable parameters of the generator neural network (G) and the discriminator neural network (D) until a loss function for the discrimination prediction is maximized with respect to the discriminator neural network (D) and minimized with respect to the generator neural network (G). In an embodiment, learnable parameters of the generative adversarial network include parameters of each affine transformation associated with the mixed-conditional batch normalization (MCBN) layer(s) and parameters of the embedding layers of the discriminator neural network (D).

Thus, after the discrimination prediction is output at step 460, learnable parameters of the discriminator are updated at step 470 using backpropagation and steps 410 to 470 are performed for the next sample from the batch.

Adversarial training means that the discriminator neural network (D) and the generator neural network (G) are iteratively trained in turn. As discussed above, the discriminator is trained on both generated images ($x_g$) received from the generator and real images ($x_r$) from the training examples. When the discriminator improves to recognize the generated images ($x_g$) as such (i.e. as "fake" images), the generator loss may be increasing.

Thus, the generator is trained to reduce this loss. In this way, the discriminator neural network (D) and generator neural network (G) are trained iteratively. For example, the training may include one or a plurality of training rounds (iterations) of training the discriminator neural network (D), followed by at least one round (iteration) of training the generator neural network (G) and then repeating the whole process.

To learn to generate realistic images, large-scale datasets are needed, ideally with many samples per category. Accordingly, in an embodiment, to overcome problems associated with training using smaller datasets, the model is initialized using a model pre-trained on a large dataset that does not have semantic annotations. In other words, before training the generative adversarial network as discussed in relation to FIG. 5 above, a version of the generative adversarial network is trained for which the parameters for categorical conditioning are removed.

Specifically, for each mixed-conditional batch normalization (MCBN) layer in the generator neural network (G), a single affine transformation $\mathcal{A}$ is used to map the second conditioning variables to the mixed-conditional batch normalization (MCBN) parameters. For the discriminator, the $y_s^T V\phi(x)$ term is removed from equation 10.

The parameters learning during pre-training of the generative adversarial network are used to initialize the parameters of the generative adversarial network for the training main training stage of FIG. 5. The generative adversarial network has $|\mathcal{S}|$ number of affine parameters in each mixed-conditional batch normalization (MCBN) layer, corresponding to the number of first conditioning variables. When using pre-training, each of the affine parameters in each mixed-conditional batch normalization (MCBN) layer is initialized using the parameters of the corresponding single transformation in the pre-trained model. The V-embedding of the projection layer of the discriminator neural network, corresponding to the embedding of the first conditioning variable, is initialized with random Gaussian noise.

Figure 6:
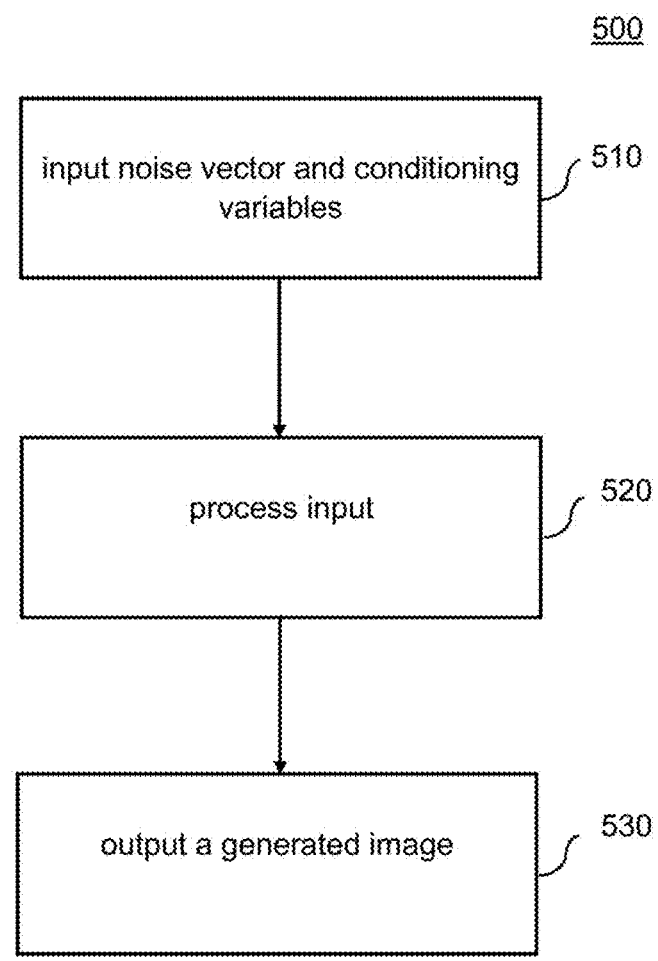
FIG. 6 illustrates a process flow diagram for a method of generating an image using the generator neural network of the generative adversarial network.
Figure 7:
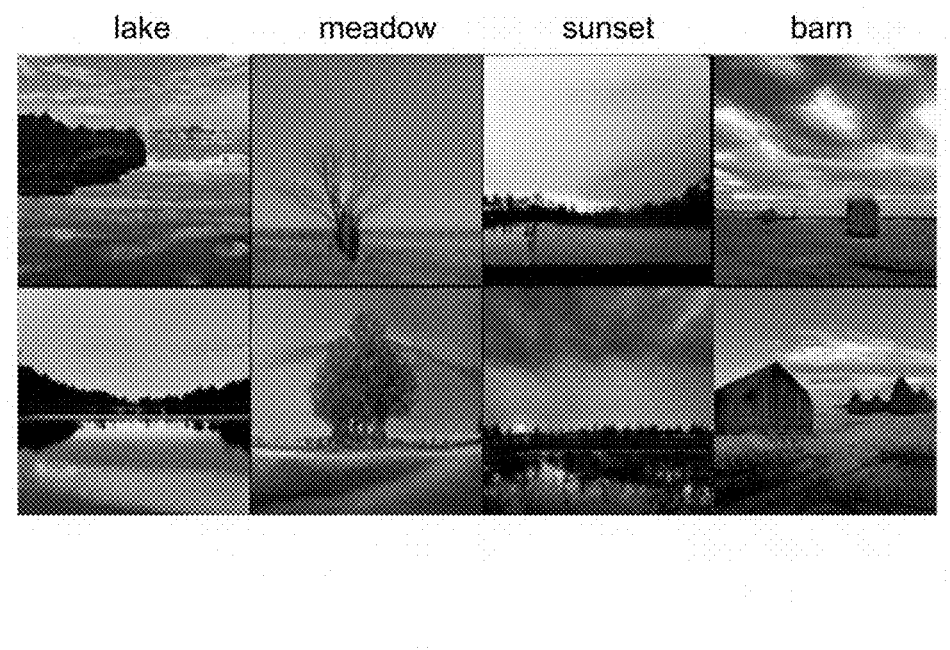
FIG. 7 shows examples of novel images generated by the generator neural network of the generative adversarial network.

Once the generative adversarial network is trained, the generative adversarial network may be used to generate synthetic images, as illustrated in FIG. 6. Method 500 begins at step 510, where the generator neural network (G) receives an input comprising a noise vector (z) and a pair of conditioning variables ($y_s$, $y_a$). The pair of conditioning variables ($y_s$, $y_a$) determine the properties of the generated image ($x_g$). For example, by inputting a first conditioning variable corresponding to a specific category (e.g., "lake") and a second conditioning variable corresponding to a high aesthetic quality, the generator neural network will generate a synthetic image depicting the specific category (e.g., a lake) and having a high aesthetic quality. This is illustrated in FIG. 7, which shows examples of images generated by the generative adversarial network. Each column shows images conditioned to depict a "lake," "meadow," "sunset," and "barn" categories, respectively, as well as to have a high aesthetic quality.

At step 520, the generator neural network (G) processes the input to generate a synthetic image according to the pair of conditioning variables ($y_s$, $y_a$). Finally, at step 530, the generator neural network (G) outputs the generated image ($x_g$). The image may be output directly to a display screen of a user device. Additionally, or alternatively, the image may be output to storage.

Figure 8:
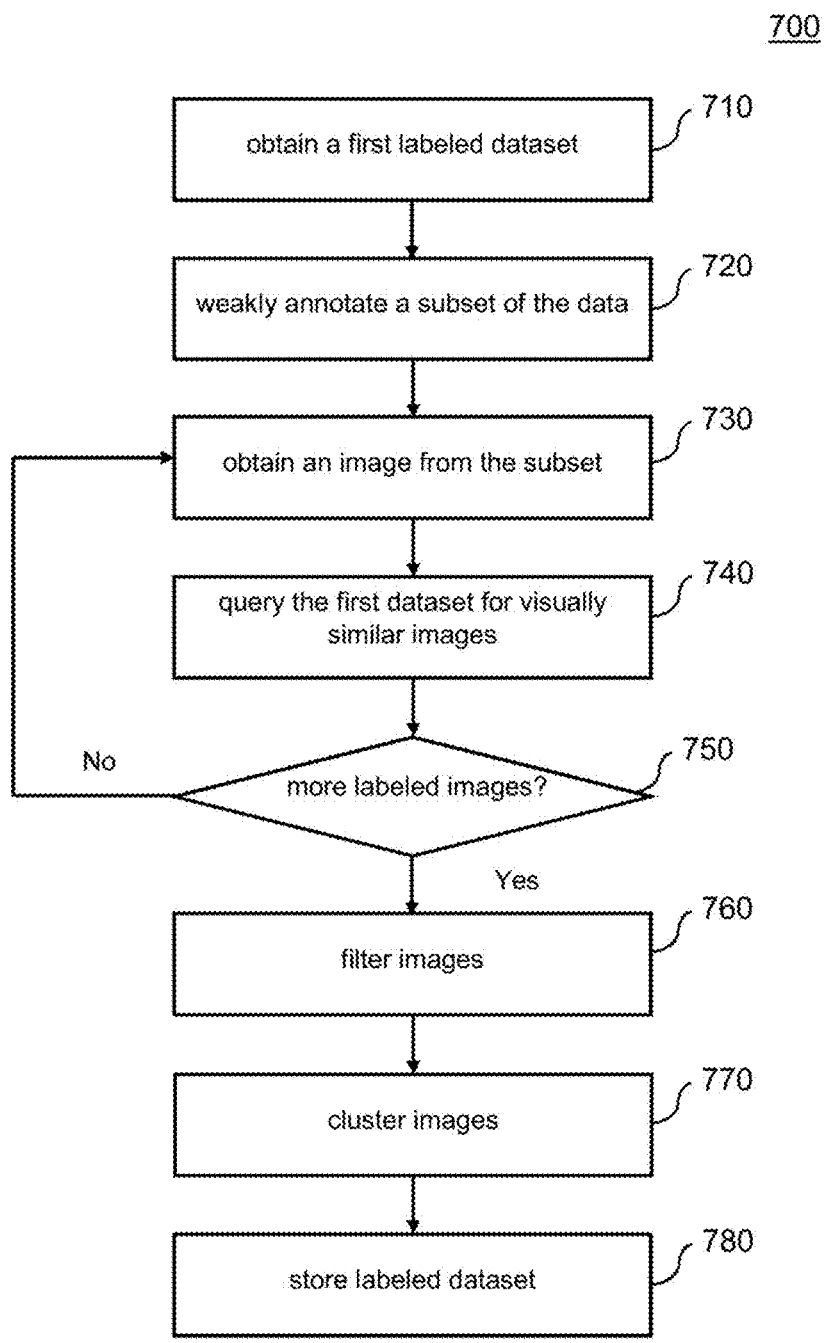
FIG. 8 illustrates a process flow diagram for a method of generating a labeled dataset.

Training the generative adversarial network is enabled by the availability of a large-scale dataset of images labeled with both categorical and second conditioning variables. FIG. 8 illustrates a method 700 of generating such a dataset using a semi-supervised approach to label the images.

At step 710, a first (large) dataset is obtained, where the first dataset includes images labeled with a first label. In an embodiment, the first label the second conditioning variable ($y_a$). Examples of such datasets are aesthetics datasets sourced from dpchallenge.com, such as AVA, which contains 255K images.

At step 720, a subset of images the first dataset is weakly annotated with a second label to form a second dataset. Any suitable method of weakly annotating the data using unsupervised learning may be used. Alternatively, the subset of images may be annotated manually by observers. In an embodiment, the second label is a category label corresponding to the first conditioning variable ($y_s$).

The second dataset is then used to query the first dataset in order to retrieve visually similar images. Thus, at step 730, a first image is obtained from the second dataset and, at step 740, the second dataset is queried to retrieve images that are visually similar to the first image. Any suitable method for retrieving visually similar images may be used. Each retrieved image is associated with a similarity score indicating how similar the retrieved image is to the queried image.

In an embodiment, a convolutional neural network extracts a feature map that is aggregated into a compact, fixed-length representation by a global-aggregation layer. This representation is first projected with a fully-connected layer, and then L2 normalized so images can be efficiently compared with the dot product to calculate a dot-product similarity score. The databases images are then ranked in decreasing order of their dot-product to each query image. One example uses the model of Gordo et al. (A. Gordo et al., "Deep image retrieval: Learning global representations for image search", *ECCV,* 2016, arXiv:1604.01325v2, which is hereby incorporated by reference)

Steps 730 and 740 are then repeated until it is determined, at step 740, that all the images of the second dataset have been queried. At this stage, one set of retrieved images for every second label has been obtained.

At step 750, the retrieved images are filtered based on their associated similarity scores. In an embodiment, only images with a similarity score above a predetermined threshold value are retained and processed in the next step. Each set of retrieved images is then clustered using spectral clustering at step 760. The clusters may be manually inspected so that similar clusters are grouped and so that clusters that are incoherent or that have fewer images than a threshold number of images are discarded. This results in a third dataset of images, where each image is labeled with a pseudo-label corresponding to a first conditioning variable and a label corresponding to a second conditioning variable.

Finally, at step 770 the third dataset is stored. In an embodiment, the first dataset is used for pre-training the generative adversarial network and the third dataset is used for training the GAN as discussed above.

An example of how the method of FIG. 8 is applied to the AVA dataset is described below.

Figure 9:
FIG. 9 shows query results for a sample of images from the AVA dataset.

A subset of 20K images from the AVA dataset was weakly annotated with 8 semantic categories using tags obtained from dpchallenge.com, with roughly 5K images per category. For each of these 20K images, the entire AVA database was queried to retrieve visually similar images. For this image retrieval procedure, representations for each database image were extracted using the model of Gordo et al. and ranked the databases images in decreasing order of their dot-product similarity to each query image. FIG. 9 shows representative query results for several images.

Among the top 5000 retrieved images for each query, all images with a similarity score higher than 0.65 were retained. This gave 8 sets of retrieved images, one per category. For each set of images, their associated image representations were clustered using spectral clustering, with the number of clusters set to 100, resulting in 800 image clusters. The clusters were manually inspected to group similar clusters and discard clusters that were incoherent or had fewer than 500 members. After this procedure, a dataset of 38506 images was obtained, with 11 pseudo-labels corresponding to: "barn," "beach," "bird," "cat," "flower," "lake," "meadow," "mountain," "portrait," "sunset," and "trees."

Figure 10:
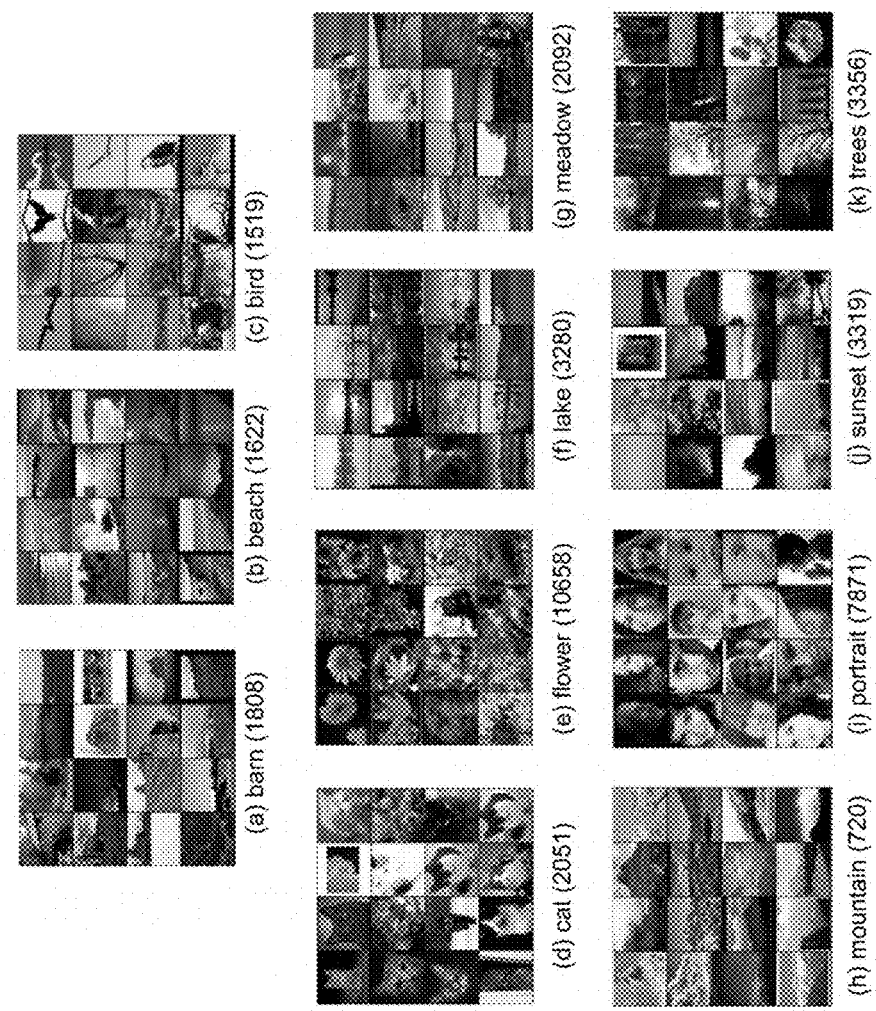
FIG. 10 shows images of the AVA-Sem dataset clustered into each of 11 pseudo-categories.

This dataset is called AVA-Sem. Image samples from each category are shown in FIG. 10, along with the number of images per category. As shown in FIG. 10, the clusters are highly semantically coherent, although there is still a high variance of style and composition, and some false positives.

In an embodiment, the generative adversarial network is implemented using a ResNet-like architecture for both the generator neural network (G) and the discriminator neural network (D). The generator neural network (G) comprises two mixed-conditional batch normalization layers within each ResNet convolutional block. Spectral normalization is applied to all of the weight tensors in the discriminator neural network (D). Images of resolution 128×128 pixels are generated. Both the generator neural network (G) and the discriminator neural network (D) are trained with a learning rate of 0.0002 and the discriminator is updated five times for every update of the generator.

The Adam optimization algorithm is used for both networks with $\beta_1=0$ and $\beta_2=0.9$. A batch size of 256 was used. Early stopping was used to terminate training. The model was implemented in PyTorch and took 40 hours to train using 2 Nvidia V100 GPUs.

For testing, the pair of conditioning variables $y_a$ and $y_s$ from the training set are used to condition the noise variable z. As an alternative to using conditioning information from the training set, the distribution $m(y_a, y_s)$ of pair of conditioning variables can be modeled and sampled.

Several metrics have been proposed to evaluate generative image models. The two most widely-used ones are the inception score (IS) (T. Salimans et al., "Improved techniques for training gans", *NIPS,* 2016) and the Fréchet inception distance (FID) (M. Heusel et al., "GANs trained by a two time-scale update rule converge to a local nash equilibrium," *NIPS,* 2017).

The inception score (IS) is derived from the softmax predictions of a deep classification model trained on ImageNet, namely InceptionV3. It was conceived to evaluate two desirable properties of a generative image model. The first is that it should generate images for which the inception model gives high confidence for one class, i.e. there should be a clear and recognizable object that belongs to one of the classes in the dataset.

The second is that it should generate images for which the inception model gives diverse predictions, i.e. the model should generate diverse content and avoid mode collapse.

The FID is derived from the image representations extracted from InceptionV3. It is a measure of the distance between the distribution of representations extracted from real images and that of generated images. Both distributions are modeled as Normal distributions. IntraFID is a variant of FID introduced to evaluate category-conditional generative adversarial networks, and is the average of the FID scores calculated between generated images and real images for each category.

Both the semantics-conditional generation and the aesthetics-conditional generation are evaluated. Results on semantics are reported by computing the IntraFID. That is, for generated and real images with semantic category, s, the statistics of their distributions are calculated and then averaged across the categories. Because the aesthetics conditioning uses a continuous random vector, $y_a$, FID or Intra-FID cannot be directly used. Two aesthetics-related categories, HiQ and LoQ, are created by retaining real and generated images with mean scores (as computed using their normalized score histograms) higher than 6.5 and lower than 4.5, respectively. The FID is then calculated separately for these two categories.

Table 1 illustrates results on the AVA-Sem dataset for the generative adversarial network with (generative adversarial network-pt) and without (generative adversarial network) pre-training. The second column shows the inception score (IS) calculated over all images. The remaining columns show the Intra-FID score across semantic categories (Intra-FID-Sem), the FID for high-quality images (FID-HiQ), and the FID for low-quality images (FID-LoQ). Unsurprisingly, pre-training the model significantly improves performance for all FID-based metrics. In addition, FID-HiQ is a fair bit higher than FID-LoQ. This may be due in part to increased complexity in modeling high quality images.

TABLE 1

| Method | IS | Intra-FID-Sem | FID-HiQ | FID-LoQ |
|---|---|---|---|---|
| GAN | 3.81 | 117.50 | 113.68 | 120.71 |
| GAN-pt | 3.95 | 75.25 | 80.62 | 66.80 |

Figure 11:
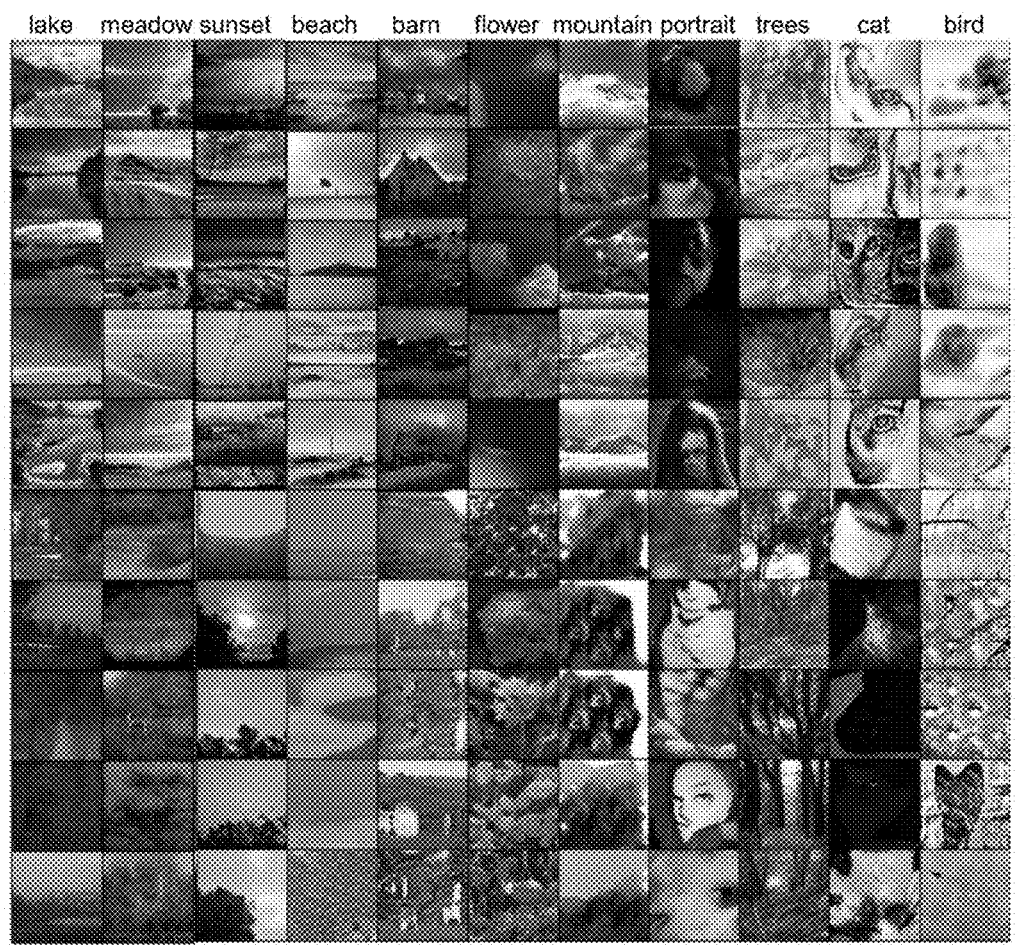
FIG. 11 shows images generated by the generator neural network of the generative adversarial network for each of the 11 pseudo-categories of the AVA-Sem dataset.

FIG. 11 shows images generated using the generator neural network of the generative adversarial network for the 11 pseudo-categories of the AVA-Sem dataset. The generative adversarial network was pre-trained. The images of each column are ordered by decreasing FID score. HiQ images are shown in the top 5 rows while LoQ images are shown in the bottom ones. For several categories, the model is able to effectively replicate key aesthetic characteristics.

For example, reflection on water is visible for images in the "lake" and "sunset" categories, and rule-of-thirds composition is present in the "sunset" and "barn" categories. Landscape categories such as "lake," "beach," and "sunset" tend to show more realism than categories corresponding to animals, plants and people, such as "portrait" and "cat".

This is likely because images in the former category are dominated by low-frequency and/or repetitive textures that are relatively easy to model. Additional causes of low realism for some categories include too few training examples, and a high degree of intra-class variability. A degree of mode collapse is evident for several semantic-aesthetic configurations.

The HiQ generated images clearly have different characteristics when compared to their LoQ counterparts. For example, HiQ images tend to exhibit high color contrast and saturation, particularly for landscape categories where a dramatic sky is desirable. In other categories such as "flower" and "portrait", they exhibit less clutter than LoQ images. This was quantitatively validated by computing the FID between generated HiQ images and real LoQ images (denoted HiQG-vs-LoQR) and vice versa (denoted LoQG-vs-HiQR). FID=86.13 was obtained for HiQG-vs-LoQR and FID=88.95 for LoQG-vs-HiQR, both of which are higher than the obtained FID-HiQ and FID-LoQ scores.

This indicates that the generated HiQ images (resp. generated LoQ images) are indeed closer to real HiQ images (resp. real LoQ images) than the generated LoQ images (resp. generated HiQ images), and that the generative adversarial network disclosed herein is able to effectively use the aesthetics-conditioning information to modulate image generation.

Figure 12:
FIG. 12 shows images generated by the generator neural network of the generative adversarial network using only aesthetic information.

Conditioning on semantics was key to generating realistic images. To illustrate this, FIG. 12 shows images generated using the generative adversarial network, which is conditioned using only aesthetic information (i.e., the generative adversarial network used for pre-training). The top 4 rows are generated with HiQ annotations and the bottom 4 with LoQ ones. While some differences in color saturation can be observed between the two sets of images, there is little recognizable structure.

While some specific embodiments have been described in detail above, it will be apparent to those skilled in the art that various modifications, variations and improvements of the embodiments may be made in the light of the above teachings and within the content of the appended claims without departing from the intended scope of the embodiments.

In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Where the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above. In a further embodiment, an apparatus comprises means, for example processing circuitry like e.g. a processor communicating with a memory, the means being configured to, or adapted to, perform one of the methods described herein. A further embodiment comprises a computer having installed thereon the computer program or instructions for performing one of the methods described herein.

Figure 13:
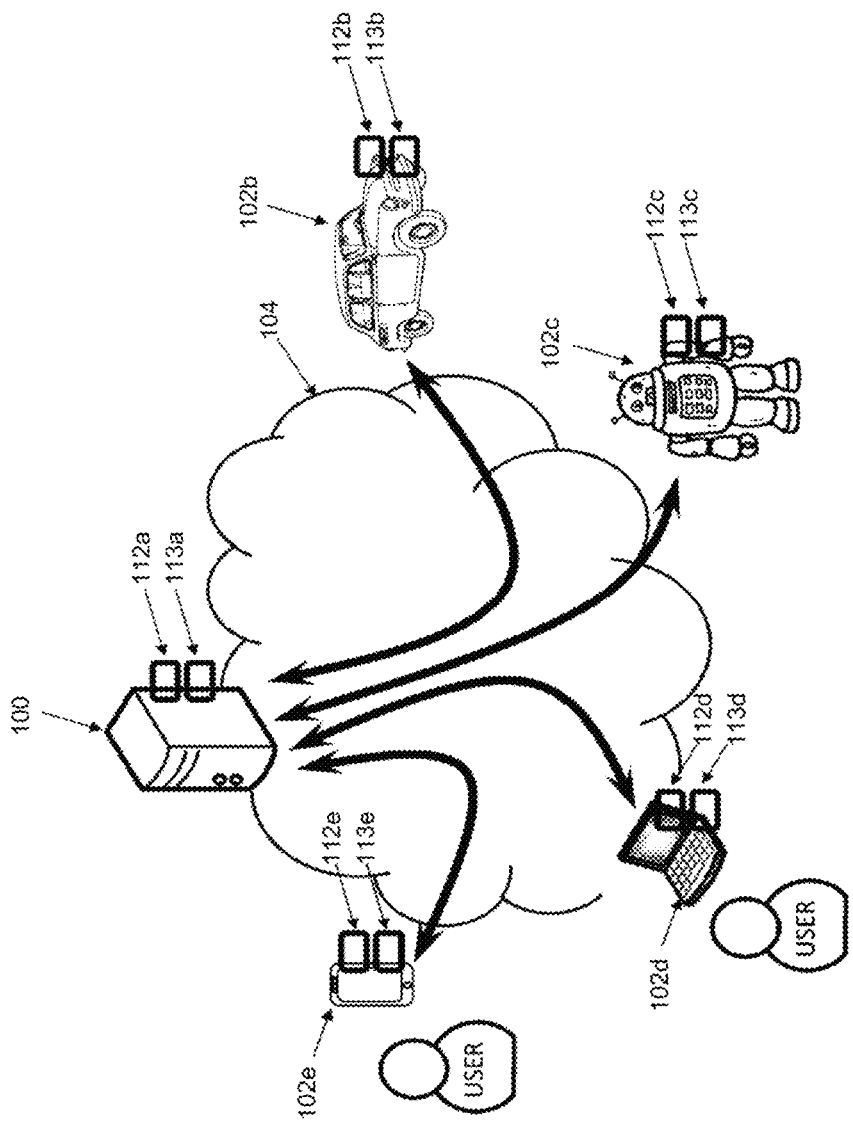
FIG. 13 illustrates an example of architecture in which the disclosed methods may be performed.

The above-mentioned systems, methods and embodiments may be implemented within an architecture such as illustrated in FIG. 13, which comprises server 100 and one or more client devices 102 that communicate over a network 104 (which may be wireless and/or wired) such as the Internet for data exchange. Server 100 and the client devices 102 include a data processor 112 and memory 113 such as a hard disk.

The client devices 102 may be any device that communicates with server 100, including autonomous vehicle 102b, robot 102c, computer 102d, or cell phone 102e. More precisely in an embodiment, the system, according to the embodiments of FIGS. 1 to 4, may be implemented by server 100 or client device 102.

In some embodiments, the system may be implemented by a different server or by a plurality of servers. Similarly, the methods, according to the embodiments of FIGS. 5 to 8, may be performed at server 100 or at client device 102. In yet other embodiments, the methods may be performed at a different server or on a plurality of servers in a distributed manner.

The method for the generation of images provides images that are highly realistic and that have high aesthetic quality for a given semantic category by addressing the problems associated with training generative adversarial networks when generating images conditioned on both semantic and aesthetic specifications.

A generative adversarial network architecture is provided which can be conditioned using both semantic and aesthetic information to be able to generate photo-realistic images with a specified aesthetic quality. A generator neural network having a modified conditional batch normalization layer is provided, enabling conditioning on both variables. Given the sensitivity of generative adversarial network training to noisy annotations, the (normalized) score histograms are used directly to condition the generative model. To do this, score histograms are mapped to parameters that condition batch normalization layers in the generator. To condition the discriminator, a joint probabilistic model of semantics and aesthetics is used to estimate the compatibility between an image (either real or generated) and the conditioning variable. Specifically, a projection-based compatibility function is provided between score histograms and image representations in the discriminator.

In an embodiment, a generative adversarial network, GAN, implemented by one or more computers to generate images, comprises: a generator neural network configured to process an input comprising a noise vector and a pair of conditioning variables to generate an image according to the conditioning variables, wherein a pair of conditioning variables comprises a first conditioning variable and a second conditioning variable, and wherein the generator neural network comprises a mixed-conditional batch normalization, MCBN, layer between a first generator neural network layer and a second generator neural network layer, and wherein the mixed-conditional batch normalization layer is configured to, during processing of the noise vector by the generator neural network: receive a first layer output generated by the first generator neural network layer and the pair of conditioning variables; normalize the first layer output to generate a normalized layer output, comprising transforming the first layer output in accordance with mixed-conditional batch normalization layer parameters to generate the normalized layer output, wherein the mixed-conditional batch normalization layer parameters are computed by applying an affine transformation to the second conditioning variable; and provide the mixed-conditional batch normalization layer output as an input to the second neural network layer.

According to an aspect, the affine transformation is one of a plurality of affine transformations, wherein each affine transformation is associated with a respective categorical conditioning variable, and wherein parameters of each affine transformation are determined by training the generative adversarial network.

According to another aspect, the generative adversarial network further comprises a discriminator neural network configured to receive and process an image and the pair of conditioning variables to output a discrimination prediction indicating whether the received image is the image generated by the generator neural network or a real image from a set of real images, wherein each image of the set of real images is labeled with a respective pair of conditioning variables.

According to an aspect, the discriminator neural network comprises a projection layer between a first discriminator neural network layer and a second discriminator neural network layer, the projection layer comprising: a first embedding layer configured to receive the first conditioning variable and to compute a first embedding of the first conditioning variable; a first compatibility function layer configured to receive an image representation of the image computed by the first discriminator neural network layer and the first embedding computed by the first embedding layer, wherein the first compatibility function layer is further configured to compute a first dot product between the first embedding and the received image representation; a second embedding layer configured to receive the second conditioning variable and to compute a second embedding of the second conditioning variable; and a second compatibility function layer configured to receive the image representation of the image computed by the first discriminator neural network layer and the second embedding computed by the second embedding layer, wherein the second compatibility function layer is further configured to compute a second dot product between the second embedding and the received image representation, wherein the projection layer is configured to output, to the second discriminator neural network layer, the first dot product and the second dot product as a projection layer output.

According to another aspect, the values of the learnable parameters of the generative adversarial network are determined by first pre-training the generative adversarial network to determine initial values of the learnable parameters using pre-training data comprising a set of pre-training images, wherein each image of the set of pre-training images is labeled with a respective second conditioning variable, and subsequently training the generative adversarial network to determine trained values of the learnable parameters using a training data comprising a set of training images, wherein each image of the set of training images is labeled with a respective pair of conditioning variables.

In an embodiment, a computer-implemented method of generating an image using a generative adversarial network (GAN) comprising a generator neural network coupled to a discriminator neural network, comprises: receiving, by the generator neural network, an input comprising a noise vector and a pair of conditioning variables, wherein a pair of conditioning variables comprises a first conditioning variable and a second conditioning variable; and processing, by the generator neural network, the input to generate an image according to the pair of conditioning variables, wherein the generator neural network comprises a mixed-conditional batch normalization, MCBN, layer between a first generator neural network layer and a second generator neural network layer, and wherein the mixed-conditional batch normalization layer is configured to: receive a first layer output generated by the first neural network layer and the pair of conditioning variables; normalize the first layer output to generate a normalized layer output, comprising transforming the first layer output in accordance with mixed-conditional batch normalization layer parameters to generate the normalized layer output, wherein the mixed-conditional batch normalization layer parameters are computed by applying an affine transformation to the second conditioning variable; and provide the mixed-conditional batch normalization layer output as an input to the second neural network layer.

According to an aspect, the affine transformation is one of a plurality of affine transformations, wherein each affine transformation is associated with a respective first conditioning variable, and the method further comprises storing the plurality of affine transformations in a look-up table.

In an embodiment a computer-implemented method of training a generative adversarial neural network (GAN) for generating images comprises: inputting, into a generator neural network of the generative adversarial neural network, a noise vector and pairs of conditioning variables of a plurality of training examples, wherein each pair of conditioning variables comprises a first conditioning variable and a second conditioning variable; generating, by the generator neural network, for each training example, a generated image based on the noise vector and the respective pair of conditioning variables, wherein the generator neural network comprises a mixed-conditional batch normalization, MCBN, layer between a first generator neural network layer and a second generator neural network layer, and wherein, for each pair of conditioning variables, the mixed-conditional batch normalization layer is configured to: receive a first layer output generated by the first neural network layer and the pair of conditioning variables; normalize the first layer output to generate a normalized layer output, comprising transforming the first layer output in accordance with mixed-conditional batch normalization layer parameters to generate the normalized layer output, wherein the MCBN layer parameters are computed by applying an affine transformation to the second conditioning variable; and provide the mixed-conditional batch normalization layer output as an input to the second neural network layer. The method further comprises inputting, into a discriminator neural network of the generative adversarial neural network, images comprising real images of the plurality of training examples and generated images; outputting, by the discriminator neural network, a discrimination prediction indicating whether each input image is a real image or a generated image; and training the generative adversarial neural network by repeatedly updating learnable parameters of the generator neural network and the discriminator neural network until a loss function for the discrimination prediction is maximized with respect to the discriminator neural network and minimized with respect to the generator neural network.

According to an aspect, the affine transformation is one of a plurality of affine transformations stored in a look-up table, wherein each affine transformation of the plurality of affine transformations is associated with a respective first conditioning variable, and wherein updating learnable parameters of the generator neural network includes updating parameters of the plurality of affine transformations.

According to another aspect, the method further comprises inputting the pairs of conditioning variables of the plurality of training examples into the discriminator neural network, wherein the discriminator neural network comprises a projection layer between a first discriminator neural network layer and a second discriminator neural network layer, and wherein, for each input image, the projection layer is configured to: receive an image representation of the image computed by the first discriminator neural network layer and the pair of conditioning variables; compute a first embedding of the first conditioning variable and a second embedding of the second conditioning variable; compute a first dot product between the first embedding (ys) and the received image representation; compute a second dot product between the second embedding and the received image representation; and output, to the second discriminator neural network layer, the first dot product and the second dot product as a projection layer output, wherein the second discriminator neural network layer is a final layer of the discriminator neural network (D), and wherein the discrimination prediction is generated based on the projection layer output.

According to an aspect, the method further comprises pre-training the generative adversarial network to determine initial values of the learnable parameters of the generator neural network and the discriminator neural network using a pre-training data comprising a pre-training set of images, wherein each image of the pre-training set of images is labeled with a respective second conditioning variable.

A generative adversarial network to generate a synthetic image corresponding to a real image, includes a memory for storing a dataset of real images; a synthetic image generating neural network configured to process a noise vector and a pair of conditioning variables to generate a synthetic image corresponding to a real image, the pair of conditioning variables being associated with a real image in the stored dataset of real images, the pair of conditioning variables including a first conditioning variable associated with semantic information corresponding to the real image and a second conditioning variable associated with aesthetic information corresponding to the real image; and a discriminator neural network, operatively connected to the synthetic image generating neural network and the memory, configured to receive an image and the pair of conditioning variables, the image being either the synthetic image generated by the synthetic image generating neural network or a real image, corresponding the synthetic image generated by the synthetic image generating neural network, from the dataset of real images and to output a discrimination prediction indicating whether the received image is the synthetic image generated by the synthetic image generating neural network or a real image from the dataset of real images; the synthetic image generating neural network including a first synthetic image generating neural network layer, a second synthetic image generating neural network layer, and a mixed-conditional batch normalization layer operatively connected between the first synthetic image generating neural network layer and the second synthetic image generating neural network layer; the mixed-conditional batch normalization layer being configured to, during processing of the noise vector by the synthetic image generating neural network, (a) receive a first layer output generated by the first synthetic image generating neural network layer and the pair of conditioning variables; (b) normalize the first layer output to generate a normalized layer output by transforming the first layer output in accordance with mixed-conditional batch normalization layer parameters, the mixed-conditional batch normalization layer parameters being $$\lambda_{s,a}=y'_a W_s^\lambda+b_s^\lambda; \beta_{s,a}=y'_a W_s^\beta+b_s^\beta$$

the $\lambda_{s,a}$ being a semantic and aesthetic specific scaling parameter, the $\mu_{s,a}$ being a semantic and aesthetic specific shifting parameter, the $\mathcal{Y}_s$ being encoded as a vector, the $\mathcal{Y}_a$ being encoded as a normalized score histogram; and (c) provide the mixed-conditional batch normalization layer output as an input to the second synthetic image generating neural network layer; the discriminator neural network including a projection layer, the projection layer producing a first compatibility function by performing a dot product on a projection of the first conditioning variable and the image received by the discriminator neural network, the projection layer producing a second compatibility function by performing a dot product on a projection of the second conditioning variable and the image received by the discriminator neural network.

A set of affine transformations may be used to create the mixed-conditional batch normalization layer parameters.

The discriminator neural network may include a first discriminator neural network layer to compute a first image representation of an image received therein and a second discriminator neural network layer, the second discriminator neural network layer outputting the discrimination prediction indicating whether the received image is the synthetic image generated by the synthetic image generating neural network or a real image from the dataset of real images; the projection layer being operatively connected to the first discriminator neural network layer and the second discriminator neural network layer; the projection layer including, a first embedding layer configured to receive the first conditioning variable and to compute a first embedding of the first conditioning variable, a first compatibility function layer configured to receive the image representation computed by the first discriminator neural network layer and the first embedding computed by the first embedding layer, the first compatibility function layer being configured to compute a first dot product between the first embedding and the received image representation by the first discriminator neural network to produce the first compatibility function, a second embedding layer configured to receive the second conditioning variable and to compute a second embedding of the second conditioning variable, and a second compatibility function layer configured to receive the image representation computed by the first discriminator neural network layer and the second embedding computed by the second embedding layer, the second compatibility function layer being configured to compute a second dot product between the second embedding and the received image representation by the first discriminator neural network to produce the second compatibility function; the projection layer outputting, to the second discriminator neural network layer, the first compatibility function and the second compatibility function.

The second discriminator neural network layer may generate the discrimination prediction based on the first compatibility function and the second compatibility function.

The first compatibility function and the second compatibility function may maximized when training the synthetic image generating neural network, the first compatibility function and the second compatibility function is maximized when training the discriminator neural network and the received image is from the dataset of real images, the first compatibility function and the second compatibility function is minimized when training the discriminator neural network and the received image is the synthetic image generated by the synthetic image generating neural network.

The generative adversarial network may be trained using a hinge loss such that the hinge loss for the discriminator loss is decomposed into a sum of two likelihood ratios, $$D^*(x, y_s, y_a) = \log\frac{q(x\mid y_s, y_a)q(y_s, y_a)}{p(x\mid y_s, y_a)p(y_s, y_a)} = \log\frac{q(x\mid y_s, y_a)}{p(x\mid y_s, y_a)} + \log\frac{q(x)}{p(x)}.$$

A method of generating a synthetic image using a generative adversarial network including a memory for storing a dataset of real images, a synthetic image generating neural network to generate a synthetic image, and a discriminator neural network, the synthetic image generating neural network including a first synthetic image generating neural network layer, a second synthetic image generating neural network layer, and a mixed-conditional batch normalization layer operatively connected between the first synthetic image generating neural network layer and the second synthetic image generating neural network layer, the discriminator neural network including a projection layer, the method includes (a) processing, by the synthetic image generating neural network, a noise vector and a pair of conditioning variables to generate a synthetic image corresponding to a real image, the pair of conditioning variables including a first conditioning variable associated with semantic information corresponding to the real image and a second conditioning variable associated with aesthetic information corresponding to the real image, the synthetic image generating neural network processing the noise vector and the pair of conditioning variables by (a1) receiving a first layer output generated by the first synthetic image generating neural network layer and the pair of conditioning variables; (a2) normalizing the first layer output to generate a normalized layer output by transforming the first layer output in accordance with mixed-conditional batch normalization layer parameters, the mixed-conditional batch normalization layer parameters being $$\lambda_{s,a}=y'_a W_s^\lambda+b_s^\lambda; \beta_{s,a}=y'_a W_s^\beta+b_s^\beta$$

$\lambda_{s,a}$ being a semantic and aesthetic specific scaling parameter, $\mu_{s,a}$ being a semantic and aesthetic specific shifting parameter, $\mathcal{Y}_s$ being encoded as a vector, $\mathcal{Y}_a$ being encoded as a normalized score histogram; and (a3) providing the mixed-conditional batch normalization layer output as an input to the synthetic image generating neural network layer; and (b) generating a discrimination prediction by the discriminator neural network, the discrimination prediction indicating whether an image is the synthetic image or the real image from the dataset of real images, by (b1) producing a first compatibility function corresponding to a dot product of a projection of the first conditioning variable and the image received by the discriminator neural network, (b2) producing a second compatibility function corresponding to a dot product of a projection of the second conditioning variable and the image received by the discriminator neural network.

A set of affine transformations may be used to create the mixed-conditional batch normalization layer parameters.

The discriminator neural network may include a first discriminator neural network layer to compute a first image representation of an image received therein and a second discriminator neural network layer, the second discriminator neural network layer outputting the discrimination prediction, the projection layer being operatively connected to the first discriminator neural network layer and the second discriminator neural network layer; the projection layer computing a first embedding of the first conditioning variable, computing a first dot product between the first embedding and an image representation from the first discriminator neural network to produce the first compatibility function, computing a second embedding of the second conditioning variable, and computing a second dot product between the second embedding and the image representation to produce the second compatibility function.

The first compatibility function and the second compatibility function may be maximized when training the synthetic image generating neural network, the first compatibility function and the second compatibility function being maximized when training the discriminator neural network and the received image is from the dataset of real images, the first compatibility function and the second compatibility function being minimized when training the discriminator neural network and the received image is the synthetic image.

The generative adversarial network may be trained using a hinge loss such that the hinge loss for the discriminator loss is decomposed into a sum of two likelihood ratios, $$D^*(x, y_s, y_a) = \log \frac{q(x|y_s, y_a)q(y_s, y_a)}{p(x|y_s, y_a)p(y_s, y_a)} = \log \frac{q(x|y_s, y_a)}{p(x|y_s, y_a)} + \log \frac{q(x)}{p(x)}.$$

A generative adversarial network for training a neural network to generate an image, comprising a memory for storing a dataset of real images; a synthetic image generating neural network configured to process a noise vector and a pair of conditioning variables to generate a synthetic image corresponding to a real image, the pair of conditioning variables being associated with a real image in the stored dataset of real images, the pair of conditioning variables including a first conditioning variable associated with semantic information corresponding to the real image and a second conditioning variable associated with aesthetic information corresponding to the real image; and a discriminator neural network, operatively connected to the synthetic image generating neural network and the memory, configured (a) to receive an image and the pair of conditioning variables, the image received being either (i) the synthetic image generated by the synthetic image generating neural network or (ii) a real image, corresponding the synthetic image generated by the synthetic image generating neural network, from the dataset of real images and (b) to output a discrimination prediction indicating whether the received image is the synthetic image generated by the synthetic image generating neural network or the real image from the dataset of real images; the synthetic image generating neural network including a first synthetic image generating neural network layer, a second synthetic image generating neural network layer, and a third synthetic image generating neural network layer; the second synthetic image generating neural network layer including an internal unit, the internal unit comprising a series of synthetic image generating neural network layers and a mixed-conditional batch normalization layer; the mixed-conditional batch normalization layer of the second synthetic image generating neural network layer being configured to, during processing of the noise vector by the synthetic image generating neural network, (a) receive an output signal generated by the series of synthetic image generating neural network layers and the pair of conditioning variables, (b) normalize the output signal to generate a normalized layer output by transforming the output signal in accordance with first mixed-conditional batch normalization layer parameters, and (c) provide the mixed-conditional batch normalization layer output as an input to the third synthetic image generating neural network layer; the generative adversarial network being configured to train the synthetic image generating neural network by repeatedly updating learnable parameters of the synthetic image generator neural network and the discriminator neural network until a loss function for the discrimination prediction is maximized with respect to the synthetic image discriminator neural network and minimized with respect to the generator neural network.

The first mixed-conditional batch normalization layer parameters may be $$\lambda_{s,a}=y'_a W_s^\lambda+b_s^\lambda; \beta_{s,a}=y'_a W_s^\beta+b_s^\beta;$$

the $\lambda_{s,a}$ being a semantic and aesthetic specific scaling parameter, the $\mu_{s,a}$ being a semantic and aesthetic specific shifting parameter, the $\mathcal{Y}_s$ being encoded as a vector, the $\mathcal{Y}_a$ being encoded as a normalized score histogram; a set of affine transformations is used to create the first mixed-conditional batch normalization layer parameters; and the discriminator neural network including a projection layer, the projection layer producing a first compatibility function by performing a dot product on a projection of the first conditioning variable and the image received by the discriminator neural network, the projection layer producing a second compatibility function by performing a dot product on a projection of the second conditioning variable and the image received by the discriminator neural network.

The discriminator neural network may include a first discriminator neural network layer to compute a first image representation of an image received therein and a second discriminator neural network layer, the second discriminator neural network layer outputting the discrimination prediction indicating whether the received image is the synthetic image generated by the synthetic image generating neural network or a real image from the dataset of real images; the projection layer being operatively connected to the first discriminator neural network layer and the second discriminator neural network layer; the projection layer including a first embedding layer configured to receive the first conditioning variable and to compute a first embedding of the first conditioning variable, a first compatibility function layer configured to receive the image representation computed by the first discriminator neural network layer and the first embedding computed by the first embedding layer, the first compatibility function layer being configured to compute a first dot product between the first embedding and the received image representation by the first discriminator neural network to produce the first compatibility function, a second embedding layer configured to receive the second conditioning variable and to compute a second embedding of the second conditioning variable, and a second compatibility function layer configured to receive the image representation computed by the first discriminator neural network layer and the second embedding computed by the second embedding layer, the second compatibility function layer being configured to compute a second dot product between the second embedding and the received image representation by the first discriminator neural network to produce the second compatibility function; the projection layer outputting, to the second discriminator neural network layer, the first compatibility function and the second compatibility function.

The second discriminator neural network layer may be a final layer of the discriminator neural network, the discrimination prediction being generated based on the projection layer output.

The parameters of the first embedding layer and parameters of the second embedding layer may be determined by training with the generative adversarial network.

The second discriminator neural network layer may generate the discrimination prediction based on the first compatibility function and the second compatibility function.

The first compatibility function and the second compatibility function may be maximized when training the synthetic image generating neural network; the first compatibility function and the second compatibility function being maximized when training the discriminator neural network and the received image is from the dataset of real images; the first compatibility function and the second compatibility function being minimized when training the discriminator neural network and the received image is the synthetic image generated by the synthetic image generating neural network.

The generative adversarial network may be trained using a hinge loss such that the hinge loss for the discriminator loss is decomposed into a sum of two likelihood ratios, $$D^*(x, y_s, y_a) = \log\frac{q(x|y_s, y_a)q(y_s, y_a)}{p(x|y_s, y_a)p(y_s, y_a)} = \log\frac{q(x|y_s, y_a)}{p(x|y_s, y_a)} + \log\frac{q(x)}{p(x)}.$$

The second synthetic image generating neural network layer includes a first internal unit with a first mixed-conditional batch normalization layer and a second internal unit with a second mixed-conditional batch normalization layer; the first internal unit including a first convolution layer and a first activation function in series; the second internal unit including a second convolution layer and a second activation function in series; and the first mixed-conditional batch normalization layer generating an output as an input to the second internal unit.

The first mixed-conditional batch normalization layer parameters may be computed by applying an affine transformation to the second conditioning variable; the affine transformation being one of a plurality of affine transformations, each affine transformation being associated with a respective first conditioning variable, each affine transformation having parameters determined by training with the generative adversarial network.

The generative adversarial network may further comprise a first upsampling layer, connected in parallel to the first and second internal units, and a second upsampling layer connected in series with the first and second internal units.

The second upsampling layer may be located within the second internal unit, between the second convolution layer and the second activation function.

The second upsampling layer may be located between the second internal unit and the first internal unit.

The first activation function may be a first rectified linear unit and the second activation function may be a second rectified linear unit.

The synthetic image generator neural network may further include a combining layer to combine an output from the first upsampling layer and an output from the second internal unit.

The synthetic image generator neural network may further include a third internal unit having a third mixed-conditional batch normalization layer, a third convolution layer, and a third activation function; the first upsampling layer being connected in parallel to the first, second, and third internal units; the second upsampling layer being connected in series with the first, second, and third internal units.

The second upsampling layer may be located within the second internal unit.

The second upsampling layer may be located within the third internal unit.

The second upsampling layer may be located within the second internal unit between the second convolution layer and the second activation function.

The second upsampling layer may be located between the second internal unit and the third internal unit.

The second upsampling layer may be located between the second internal unit and the first internal unit.

The second upsampling layer may be located between the third internal unit and the first internal unit.

A method of generating a synthetic image using a neural network trained using a generative adversarial network including a memory for storing a dataset of real images, a synthetic image generating neural network to generate a synthetic image, and a discriminator neural network, the method comprises (a) processing, by the synthetic image generating neural network using a first synthetic image generating neural network layer, a second synthetic image generating neural network layer, and a third synthetic image generating neural network layer, where the second synthetic image generating neural network layer includes one or more internal units, with each internal unit comprising a series of synthetic image generating neural network layers and a mixed-conditional batch normalization layer: a noise vector and a pair of conditioning variables to generate a synthetic image corresponding to a real image, the pair of conditioning variables including a first conditioning variable associated with semantic information corresponding to the real image and a second conditioning variable associated with aesthetic information corresponding to the real image, the mixed-conditional batch normalization layer of the second synthetic image generating neural network layer processing the noise vector and the pair of conditioning variables by (a1) receiving an output signal generated by the series of synthetic image generating neural network layers and the pair of conditioning variables, (a2) normalizing the output signal to generate a normalized layer output by transforming the output signal in accordance with mixed-conditional batch normalization layer parameters, and (a3) providing the mixed-conditional batch normalization layer output as an input to the third synthetic image generating neural network layer; and (b) training, by the generative adversarial network, the synthetic image generating neural network by repeatedly updating learnable parameters of the synthetic image generator neural network and the discriminator neural network until a loss function for the discrimination prediction is maximized with respect to the synthetic image discriminator neural network and minimized with respect to the generator neural network.

The mixed-conditional batch normalization layer parameters may be $$\lambda_{s,a}=y'_a W_s^\lambda+b_s^\lambda; \beta_{s,a}=y'_a W_s^\beta+b_s^\beta;$$

$\lambda_{s,a}$ being a semantic and aesthetic specific scaling parameter, $\beta_{s,a}$ being a semantic and aesthetic specific shifting parameter, $\mathcal{Y}_s$ being encoded as a vector, $\mathcal{Y}_a$ being encoded as a normalized score histogram; a set of affine transformations being used to create the mixed-conditional batch normalization layer parameters; the method further comprising (c) generating a discrimination prediction by the discriminator neural network, the discrimination prediction indicating whether an image is the synthetic image or the real image from the dataset of real images, by (b1) producing a first compatibility function corresponding to a dot product of a projection of the first conditioning variable and the image received by the discriminator neural network, and (b2) producing a second compatibility function corresponding to a dot product of a projection of the second conditioning variable and the image received by the discriminator neural network.

The discriminator neural network may include a first discriminator neural network layer to compute a first image representation of an image received therein and a second discriminator neural network layer, the second discriminator neural network layer outputting the discrimination prediction, the projection layer being operatively connected to the first discriminator neural network layer and the second discriminator neural network layer; the projection layer computing a first embedding of the first conditioning variable, computing a first dot product between the first embedding and an image representation from the first discriminator neural network to produce the first compatibility function, computing a second embedding of the second conditioning variable, and computing a second dot product between the second embedding and the image representation to produce the second compatibility function.

The first compatibility function and the second compatibility function may be maximized when training the synthetic image generating neural network, the first compatibility function and the second compatibility function being maximized when training the discriminator neural network and the received image is from the dataset of real images, the first compatibility function and the second compatibility function being minimized when training the discriminator neural network and the received image is the synthetic image.

The generative adversarial network may be trained using a hinge loss such that the hinge loss for the discriminator loss is decomposed into a sum of two likelihood ratios, $$D^*(x, y_s, y_a) = \log\frac{q(x\mid y_s, y_a)q(y_s, y_a)}{p(x\mid y_s, y_a)p(y_s, y_a)} = \log\frac{q(x\mid y_s, y_a)}{p(x\mid y_s, y_a)} + \log\frac{q(x)}{p(x)}.$$

A method of generating an image using a neural network, the method comprises (a) receiving, by a synthetic image generator neural network, an input comprising a noise vector and a pair of conditioning variables, the pair of conditioning variables including a first conditioning variable and a second conditioning variable; and (b) processing, by the synthetic image generator neural network, the input to generate a synthetic image corresponding to a real image according to the pair of conditioning variables; the synthetic image generator neural network including a first synthetic image generating neural network layer, a second synthetic image generating neural network layer, and a third synthetic image generating neural network layer; the second synthetic image generating neural network layer including an internal unit, the internal unit including a series of synthetic image generating neural network layers and a mixed-conditional batch normalization layer; the mixed-conditional batch normalization layer being configured (a1) to receive (i) an output signal generated by the series of synthetic image generating neural network layers and (ii) the pair of conditioning variables, (a2) to normalize the output signal by transforming the output signal in accordance with mixed-conditional batch normalization layer parameters to generate mixed-conditional batch normalization layer output, the mixed-conditional batch normalization layer parameters being computed by applying an affine transformation to the second conditioning variable, and (a3) to provide the mixed-conditional batch normalization layer output as an input to the second internal unit.

The second synthetic image generating neural network layer may include a first internal unit with a first mixed-conditional batch normalization layer and a second internal unit with a second mixed-conditional batch normalization layer; the first internal unit includes a first convolution layer and a first activation function in series; and the second internal unit includes a second convolution layer and a second activation function in series.

The synthetic image generator neural network may include a first upsampling layer, connected in parallel to the first internal unit and the second internal unit, and a second upsampling layer connected in series with the first internal unit and the second internal unit.

The first internal unit may have a first mixed-conditional batch normalization layer, a first convolution layer, and a first activation function; the second internal unit having a second mixed-conditional batch normalization layer, a second convolution layer, and a second activation function.

The affine transformation may be one of a plurality of affine transformations, each affine transformation being associated with a respective first conditioning variable, each affine transformation having parameters determined by training with a generative adversarial network.

The method may further comprise (c) receiving, by a discriminator neural network, an input comprising an image and the pair of conditioning variables, the image being one of the generated image and a real image from a set of real images, each real image of the set of real images being labeled with a respective pair of conditioning variables; and (d) processing the input, by the discriminator neural network, to output a discrimination prediction indicating whether the received image is the generated image or the real image; the discriminator neural network including a projection layer, a first discriminator neural network layer, and a second discriminator neural network layer, the projection layer being located between the first discriminator neural network layer and the second discriminator neural network layer, the first discriminator neural network layer generating an image representation of the received image; the projection layer being configured (c1) to receive an image representation of the image computed by the first discriminator neural network layer and the pair of conditioning variables, (c2) to compute a first embedding of the first conditioning variable and a second embedding of the second conditioning variable, (c3) to compute a first dot product between the first embedding and the received image representation and a second dot product between the second embedding and the received image representation, and (c4) to output, to the second discriminator neural network layer, the first dot product and the second dot product as a projection layer output; the second discriminator neural network layer being a final layer of the discriminator neural network, the discrimination prediction being generated based on the projection layer output.

A method of training a neural network for generating images using a generative adversarial network, the method comprises (a) inputting, into a generator neural network of the generative adversarial network, a noise vector and pairs of conditioning variables of a plurality of training examples, each pair of conditioning variables including a first conditioning variable and a second conditioning variable; (b) generating, by the generator neural network, for each training example, a generated image based on the noise vector and the respective pair of conditioning variables, the generator neural network including a first internal unit, a second internal unit, a first upsampling layer, connected in parallel to the first and second internal units, and a second upsampling layer, connected in series with the first and second internal units, the first internal unit having a first mixed-conditional batch normalization layer, a first convolution layer, and a activation function, the second internal unit having a second mixed-conditional batch normalization layer, a second convolution layer, and a second activation function; the mixed-conditional batch normalization layer being configured (a1) to receive (i) an output signal generated by a combination of the first convolution layer and the first activation function and (ii) the pair of conditioning variables, (a2) to normalize the output signal by transforming the output signal in accordance with first mixed-conditional batch normalization layer parameters to generate a first mixed-conditional batch normalization layer output, the first mixed-conditional batch normalization layer parameters being computed by applying an affine transformation to the second conditioning variable, and (a3) to provide the mixed-conditional batch normalization layer output as an input to the second internal unit; (c) inputting, into a discriminator neural network of the generative adversarial network, images comprising real images of the plurality of training examples and generated images; (d) outputting, by the discriminator neural network, a discrimination prediction indicating whether each input image is a real image or a generated image; and (e) training the generative adversarial network by repeatedly updating learnable parameters of the generator neural network and the discriminator neural network until a loss function for the discrimination prediction is maximized with respect to the discriminator neural network and minimized with respect to the generator neural network.

The affine transformation may be one of a plurality of affine transformations, each affine transformation being associated with a respective first conditioning variable; the updating of the learnable parameters of the generator neural network and the discriminator neural network including updating parameters of the plurality of affine transformations.

The method may further comprise (f) inputting the pairs of conditioning variables of the plurality of training examples into the discriminator neural network; the discriminator neural network including a projection layer, a first discriminator neural network layer, and a second discriminator neural network layer, the projection layer being located between the first discriminator neural network layer and the second discriminator neural network layer, the first discriminator neural network layer generating an image representation of the received image; the projection layer being configured (b1) to receive the image representation of the image computed by the first discriminator neural network layer and the pair of conditioning variables, (b2) to compute a first embedding of the first conditioning variable and a second embedding of the second conditioning variable, (b3) to compute a first dot product between the first embedding and the received image representation, (b4) to compute a second dot product between the second embedding and the received image representation, and (b5) to output, to the second discriminator neural network layer, the first dot product and the second dot product as a projection layer output; the second discriminator neural network layer being a final layer of the discriminator neural network, the discrimination prediction being generated based on the projection layer output.

The method may further comprise (f) pre-training the generative adversarial network to determine initial values of the learnable parameters of the generator neural network and the discriminator neural network using a pre-training data comprising a pre-training set of images each image of the pre-training set of images being labeled with a respective second conditioning variable.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. A generative adversarial network for training a neural network to generate an image, comprising:
   a memory for storing a dataset of real images;
   a synthetic image generating neural network configured to process a noise vector and a pair of conditioning variables to generate a synthetic image corresponding to a real image, said pair of conditioning variables being associated with a real image in the stored dataset of real images, said pair of conditioning variables including a first conditioning variable associated with semantic information corresponding to the real image and a second conditioning variable associated with aesthetic information corresponding to the real image; and
   a discriminator neural network, operatively connected to said synthetic image generating neural network and said memory, configured (a) to receive an image and said pair of conditioning variables, the image received being either (i) said synthetic image generated by said synthetic image generating neural network or (ii) a real image, corresponding said synthetic image generated by said synthetic image generating neural network, from said dataset of real images and (b) to output a discrimination prediction indicating whether the received image is said synthetic image generated by said synthetic image generating neural network or said real image from said dataset of real images;
   said synthetic image generating neural network including a first synthetic image generating neural network layer, a second synthetic image generating neural network layer, and a third synthetic image generating neural network layer;
   said second synthetic image generating neural network layer including an internal unit, said internal unit comprising a series of synthetic image generating neural network layers and a mixed-conditional batch normalization layer;

said mixed-conditional batch normalization layer of said second synthetic image generating neural network layer being configured to, during processing of the noise vector by said synthetic image generating neural network, (a) receive an output signal generated by said series of synthetic image generating neural network layers and said pair of conditioning variables, (b) normalize said output signal to generate a normalized layer output by transforming said output signal in accordance with mixed-conditional batch normalization layer parameters, the mixed-conditional batch normalization layer parameters being a semantic specific scaling parameter, an aesthetic specific scaling parameter, a semantic specific shifting parameter, and an aesthetic specific shifting parameter, and (c) provide said mixed-conditional batch normalization layer output as an input to said third synthetic image generating neural network layer;

said mixed-conditional batch normalization layer being conditioned on categorical information related to semantics and continuous information in the form of histogram score distributions using a set of affine transformations;

the generative adversarial network being configured to train the synthetic image generating neural network by repeatedly updating learnable parameters of the synthetic image generator neural network and the discriminator neural network until a loss function for the discrimination prediction is maximized with respect to the synthetic image discriminator neural network and minimized with respect to the generator neural network.

2. The generative adversarial network as claimed in claim 1, wherein said discriminator neural network including a projection layer, said projection layer producing a first compatibility function by performing a dot product on a projection of said first conditioning variable and the image received by said discriminator neural network, said projection layer producing a second compatibility function by performing a dot product on a projection of said second conditioning variable and the image received by said discriminator neural network.

3. The generative adversarial network as claimed in claim 2, wherein said discriminator neural network includes a first discriminator neural network layer to compute a first image representation of an image received therein and a second discriminator neural network layer, said second discriminator neural network layer outputting said discrimination prediction indicating whether the received image is said synthetic image generated by said synthetic image generating neural network or a real image from said dataset of real images;

said projection layer being operatively connected to said first discriminator neural network layer and said second discriminator neural network layer;

said projection layer including, a first embedding layer configured to receive said first conditioning variable and to compute a first embedding of said first conditioning variable, a first compatibility function layer configured to receive said image representation computed by said first discriminator neural network layer and said first embedding computed by said first embedding layer, said first compatibility function layer being configured to compute a first dot product between said first embedding and said received image representation by said first discriminator neural network to produce said first compatibility function, a second embedding layer configured to receive said second conditioning variable and to compute a second embedding of said second conditioning variable, and a second compatibility function layer configured to receive said image representation computed by said first discriminator neural network layer and said second embedding computed by said second embedding layer, said second compatibility function layer being configured to compute a second dot product between said second embedding and said received image representation by said first discriminator neural network to produce said second compatibility function;

said projection layer outputting, to said second discriminator neural network layer, said first compatibility function and said second compatibility function.

4. The generative adversarial network as claimed in claim 3, wherein said second discriminator neural network layer is a final layer of said discriminator neural network, said discrimination prediction being generated based on said projection layer output.

5. The generative adversarial network as claimed in claim 3, wherein parameters of said first embedding layer and parameters of said second embedding layer are determined by training with the generative adversarial network.

6. The generative adversarial network as claimed in claim 3, wherein said second discriminator neural network layer generates said discrimination prediction based on said first compatibility function and said second compatibility function.

7. The generative adversarial network as claimed in claim 3, wherein said first compatibility function and said second compatibility function is maximized when training said synthetic image generating neural network;

said first compatibility function and said second compatibility function being maximized when training said discriminator neural network and the received image is from said dataset of real images;

said first compatibility function and said second compatibility function being minimized when training said discriminator neural network and the received image is said synthetic image generated by said synthetic image generating neural network.

8. The generative adversarial network as claimed in claim 5, wherein the generative adversarial network is trained using a hinge loss such that the hinge loss for the discriminator loss is decomposed into a sum of two likelihood ratios, $$D^*(x, y_s, y_a) = \log\frac{q(x|y_s, y_a)q(y_s, y_a)}{p(x|y_s, y_a)p(y_s, y_a)} = \log\frac{q(x|y_s, y_a)}{p(x|y_s, y_a)} + \log\frac{q(x)}{p(x)}.$$

9. The generative adversarial network as claimed in claim 1, wherein said second synthetic image generating neural network layer includes a first internal unit with a first mixed-conditional batch normalization layer and a second internal unit with a second mixed-conditional batch normalization layer;

said first internal unit including a first convolution layer and a first activation function in series;

said second internal unit including a second convolution layer and a second activation function in series; and said first mixed-conditional batch normalization layer generating an output as an input to said second internal unit.

10. The generative adversarial network as claimed in claim 9, wherein said first mixed-conditional batch normalization layer parameters is computed by applying an affine transformation to said second conditioning variable;

said affine transformation being one of a plurality of affine transformations, each affine transformation being associated with a respective first conditioning variable, each affine transformation having parameters determined by training with the generative adversarial network.

11. The generative adversarial network as claimed in claim 9, further comprising:

a first upsampling layer, connected in parallel to said first and second internal units, and a second upsampling layer connected in series with said first and second internal units.

12. The generative adversarial network as claimed in claim 11, wherein said second upsampling layer is located within said second internal unit, between said second convolution layer and said second activation function.

13. The generative adversarial network as claimed in claim 11, wherein said second upsampling layer is located between said second internal unit and said first internal unit.

14. The generative adversarial network as claimed in claim 9, wherein said first activation function is a first rectified linear unit and said second activation function is a second rectified linear unit.

15. The generative adversarial network as claimed in claim 14, wherein said synthetic image generator neural network further includes a combining layer to combine an output from said first upsampling layer and an output from said second internal unit.

16. The generative adversarial network as claimed in claim 9, wherein said synthetic image generator neural network further includes a third internal unit having a third mixed-conditional batch normalization layer, a third convolution layer, and a third activation function;

said first upsampling layer being connected in parallel to said first, second, and third internal units;

said second upsampling layer being connected in series with said first, second, and third internal units.

17. The generative adversarial network as claimed in claim 16, wherein said second upsampling layer is located within said second internal unit.

18. The generative adversarial network as claimed in claim 16, wherein said second upsampling layer is located within said third internal unit.

19. The generative adversarial network as claimed in claim 17, wherein said second upsampling layer is located within said second internal unit between said second convolution layer and said second activation function.

20. The generative adversarial network as claimed in claim 16, wherein said second upsampling layer is located between said second internal unit and said third internal unit.

21. The generative adversarial network as claimed in claim 19, wherein said second upsampling layer is located between said second internal unit and said first internal unit.

22. The generative adversarial network as claimed in claim 19, wherein said second upsampling layer is located between said third internal unit and said first internal unit.

23. A method of generating a synthetic image using a neural network trained using a generative adversarial network including a memory for storing a dataset of real images, a synthetic image generating neural network to generate a synthetic image, and a discriminator neural network, the method comprising:

(a) processing, by the synthetic image generating neural network using a first synthetic image generating neural network layer, a second synthetic image generating neural network layer, and a third synthetic image generating neural network layer, where said second synthetic image generating neural network layer includes one or more internal units, with each internal unit comprising a series of synthetic image generating neural network layers and a mixed-conditional batch normalization layer: a noise vector and a pair of conditioning variables to generate a synthetic image corresponding to a real image, the pair of conditioning variables including a first conditioning variable associated with semantic information corresponding to the real image and a second conditioning variable associated with aesthetic information corresponding to the real image, the mixed-conditional batch normalization layer of the second synthetic image generating neural network layer processing the noise vector and the pair of conditioning variables by (a1) receiving an output signal generated by the series of synthetic image generating neural network layers and the pair of conditioning variables, (a2) normalizing the output signal to generate a normalized layer output by transforming the output signal in accordance with mixed-conditional batch normalization layer parameters, the mixed-conditional batch normalization layer parameters being a semantic specific scaling parameter, an aesthetic specific scaling parameter, a semantic specific shifting parameter, and an aesthetic specific shifting parameter, and (a3) providing the mixed-conditional batch normalization layer output as an input to the third synthetic image generating neural network layer, the mixed-conditional batch normalization layer being conditioned on categorical information related to semantics and continuous information in the form of histogram score distributions using a set of affine transformations; and (b) training, by the generative adversarial network, the synthetic image generating neural network by repeatedly updating learnable parameters of the synthetic image generator neural network and the discriminator neural network until a loss function for the discrimination prediction is maximized with respect to the synthetic image discriminator neural network and minimized with respect to the generator neural network.

24. The method as claimed in claim 23, further comprising (c) generating a discrimination prediction by the discriminator neural network, the discrimination prediction indicating whether an image is the synthetic image or the real image from the dataset of real images, by (c1) producing a first compatibility function corresponding to a dot product of a projection of the first conditioning variable and the image received by the discriminator neural network, and (c2) producing a second compatibility function corresponding to a dot product of a projection of the second conditioning variable and the image received by the discriminator neural network.

25. The method as claimed in claim 24, wherein the discriminator neural network includes a first discriminator neural network layer to compute a first image representation of an image received therein and a second discriminator neural network layer, the second discriminator neural network layer outputting the discrimination prediction, the projection layer being operatively connected to the first discriminator neural network layer and the second discriminator neural network layer;

the projection layer computing a first embedding of the first conditioning variable, computing a first dot product between the first embedding and an image representation from the first discriminator neural network to produce the first compatibility function, computing a second embedding of the second conditioning variable, and computing a second dot product between the second embedding and the image representation to produce the second compatibility function.

26. The method as claimed in claim 25, wherein the first compatibility function and the second compatibility function being maximized when training the synthetic image generating neural network, the first compatibility function and the second compatibility function being maximized when training the discriminator neural network and the received image is from the dataset of real images, the first compatibility function and the second compatibility function being minimized when training the discriminator neural network and the received image is the synthetic image.

27. The method as claimed in claim 26, wherein the generative adversarial network is trained using a hinge loss such that the hinge loss for the discriminator loss is decomposed into a sum of two likelihood ratios, $$D^*(x, y_s, y_a) = \log\frac{q(x|y_s, y_a)q(y_s, y_a)}{p(x|y_s, y_a)p(y_s, y_a)} = \log\frac{q(x|y_s, y_a)}{p(x|y_s, y_a)} + \log\frac{q(x)}{p(x)}.$$

28. A method of generating an image using a neural network, the method comprising:
(a) receiving, by a synthetic image generator neural network, an input comprising a noise vector and a pair of conditioning variables, the pair of conditioning variables including a first conditioning variable and a second conditioning variable; and
(b) processing, by the synthetic image generator neural network, the input to generate a synthetic image corresponding to a real image according to the pair of conditioning variables;
the synthetic image generator neural network including a first synthetic image generating neural network layer, a second synthetic image generating neural network layer, and a third synthetic image generating neural network layer;
the second synthetic image generating neural network layer including an internal unit, the internal unit including a series of synthetic image generating neural network layers and a mixed-conditional batch normalization layer;
the mixed-conditional batch normalization layer being configured (a1) to receive (i) an output signal generated by the series of synthetic image generating neural network layers and (ii) the pair of conditioning variables, (a2) to normalize the output signal by transforming the output signal in accordance with mixed-conditional batch normalization layer parameters to generate mixed-conditional batch normalization layer output, the mixed-conditional batch normalization layer parameters being a semantic specific scaling parameter, an aesthetic specific scaling parameter, a semantic specific shifting parameter, and an aesthetic specific shifting parameter, and (a3) to provide the mixed-conditional batch normalization layer output as an input to the second internal unit;
the mixed-conditional batch normalization layer being conditioned on categorical information related to semantics and continuous information in the form of histogram score distributions using a set of affine transformations.

29. The method as claimed in claim 28, wherein the second synthetic image generating neural network layer includes a first internal unit with a first mixed-conditional batch normalization layer and a second internal unit with a second mixed-conditional batch normalization layer;
the first internal unit includes a first convolution layer and a first activation function in series; and
the second internal unit includes a second convolution layer and a second activation function in series.

30. The method as claimed in claim 29, wherein the synthetic image generator neural network includes a first upsampling layer, connected in parallel to the first internal unit and the second internal unit, and a second upsampling layer connected in series with the first internal unit and the second internal unit.

31. The method as claimed in claim 30, wherein the first internal unit has a first mixed-conditional batch normalization layer, a first convolution layer, and a first activation function;
the second internal unit having a second mixed-conditional batch normalization layer, a second convolution layer, and a second activation function.

32. The method as claimed in claim 28, wherein the affine transformation is one of a plurality of affine transformations, each affine transformation being associated with a respective first conditioning variable, each affine transformation having parameters determined by training with a generative adversarial network.

33. The method as claimed in claim 28, further comprising:
(c) receiving, by a discriminator neural network, an input comprising an image and the pair of conditioning variables, the image being one of the generated image and a real image from a set of real images, each real image of the set of real images being labeled with a respective pair of conditioning variables; and
(d) processing the input, by the discriminator neural network, to output a discrimination prediction indicating whether the received image is the generated image or the real image;
the discriminator neural network including a projection layer, a first discriminator neural network layer, and a second discriminator neural network layer, the projection layer being located between the first discriminator neural network layer and the second discriminator neural network layer, the first discriminator neural network layer generating an image representation of the received image;
the projection layer being configured (c1) to receive an image representation of the image computed by the first discriminator neural network layer and the pair of conditioning variables, (c2) to compute a first embedding of the first conditioning variable and a second embedding of the second conditioning variable, (c3) to compute a first dot product between the first embedding and the received image representation and a second dot product between the second embedding and the received image representation, and (c4) to output, to the second discriminator neural network layer, the first dot product and the second dot product as a projection layer output;

the second discriminator neural network layer being a final layer of the discriminator neural network, the discrimination prediction being generated based on the projection layer output.

34. A method of training a neural network for generating images using a generative adversarial network, the method comprising:
(a) inputting, into a generator neural network of the generative adversarial network, a noise vector and pairs of conditioning variables of a plurality of training examples, each pair of conditioning variables including a first conditioning variable and a second conditioning variable;
(b) generating, by the generator neural network, for each training example, a generated image based on the noise vector and the respective pair of conditioning variables, the generator neural network including a first internal unit, a second internal unit, a first upsampling layer, connected in parallel to the first and second internal units, and a second upsampling layer, connected in series with the first and second internal units, the first internal unit having a first mixed-conditional batch normalization layer, a first convolution layer, and a activation function, the second internal unit having a second mixed-conditional batch normalization layer, a second convolution layer, and a second activation function;
the mixed-conditional batch normalization layer being configured (a1) to receive (i) an output signal generated by a combination of the first convolution layer and the first activation function and (ii) the pair of conditioning variables, (a2) to normalize the output signal by transforming the output signal in accordance with mixed-conditional batch normalization layer parameters to generate a first mixed-conditional batch normalization layer output, the mixed-conditional batch normalization layer parameters being a semantic specific scaling parameter, an aesthetic specific scaling parameter, a semantic specific shifting parameter, and an aesthetic specific shifting parameter, and (a3) to provide the mixed-conditional batch normalization layer output as an input to the second internal unit, the mixed-conditional batch normalization layer being conditioned on categorical information related to semantics and continuous information in the form of histogram score distributions using a set of affine transformations;
(c) inputting, into a discriminator neural network of the generative adversarial network, images comprising real images of the plurality of training examples and generated images;
(d) outputting, by the discriminator neural network, a discrimination prediction indicating whether each input image is a real image or a generated image; and (e) training the generative adversarial network by repeatedly updating learnable parameters of the generator neural network and the discriminator neural network until a loss function for the discrimination prediction is maximized with respect to the discriminator neural network and minimized with respect to the generator neural network.

35. The method as claimed in claim 34, wherein the affine transformation is one of a plurality of affine transformations, each affine transformation being associated with a respective first conditioning variable;
the updating of the learnable parameters of the generator neural network and the discriminator neural network including updating parameters of the plurality of affine transformations.

36. The method as claimed in claim 34, further comprising:
(f) inputting the pairs of conditioning variables of the plurality of training examples into the discriminator neural network;
the discriminator neural network including a projection layer, a first discriminator neural network layer, and a second discriminator neural network layer, the projection layer being located between the first discriminator neural network layer and the second discriminator neural network layer, the first discriminator neural network layer generating an image representation of the received image;
the projection layer being configured (b1) to receive the image representation of the image computed by the first discriminator neural network layer and the pair of conditioning variables, (b2) to compute a first embedding of the first conditioning variable and a second embedding of the second conditioning variable, (b3) to compute a first dot product between the first embedding and the received image representation, (b4) to compute a second dot product between the second embedding and the received image representation, and (b5) to output, to the second discriminator neural network layer, the first dot product and the second dot product as a projection layer output;
the second discriminator neural network layer being a final layer of the discriminator neural network, the discrimination prediction being generated based on the projection layer output.

37. The method as claimed in claim 35, further comprising:
(f) pre-training the generative adversarial network to determine initial values of the learnable parameters of the generator neural network and the discriminator neural network using a pre-training data comprising a pre-training set of images each image of the pre-training set of images being labeled with a respective second conditioning variable.

* * * * *